US012472429B2

(12) United States Patent
Osman et al.

(10) Patent No.: US 12,472,429 B2
(45) Date of Patent: Nov. 18, 2025

(54) FILLING IN FRAMES USING PREDICTION FOR WHEN CONNECTION DROPS

(71) Applicant: Sony Interactive Entertainment Inc., Tokyo (JP)

(72) Inventors: Steven Osman, San Mateo, CA (US); Jorge Arroyo Palacios, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 290 days.

(21) Appl. No.: 18/314,020

(22) Filed: May 8, 2023

(65) Prior Publication Data

US 2024/0374998 A1 Nov. 14, 2024

(51) Int. Cl.

*A63F 13/358* (2014.01)
*A63F 13/235* (2014.01)
*A63F 13/52* (2014.01)
*A63F 13/60* (2014.01)

(52) U.S. Cl.

CPC ............ *A63F 13/52* (2014.09); *A63F 13/235* (2014.09); *A63F 13/358* (2014.09); *A63F 13/60* (2014.09)

(58) Field of Classification Search

None

See application file for complete search history.

(56) References Cited

U.S. PATENT DOCUMENTS

| | | | | |
|---|---|---|---|---|
| 11,102,269 | B1 * | 8/2021 | Gupta | H04N 21/23614 |
| 2013/0097220 | A1 * | 4/2013 | Lyons | G07F 17/3223 709/203 |
| 2021/0176522 | A1 | 6/2021 | Walker | |
| 2023/0139216 | A1 | 5/2023 | Otsuka | |
| 2023/0338852 | A1 * | 10/2023 | Bae | A63F 13/67 |

FOREIGN PATENT DOCUMENTS

WO WO2022068326 A1 4/2022

OTHER PUBLICATIONS

International Search Report & Written Opinion, PCT/US2024,027552, dated Aug. 27, 2024, Total 12 pages.

* cited by examiner

*Primary Examiner* — Damon J Pierce
(74) *Attorney, Agent, or Firm* — Kilpatrick Townsend & Stockton LLP

(57) ABSTRACT

Methods and system for providing streaming content of a video game at a client device includes receiving frames of streaming content from a game server. The frames represent a current game state. The frames are analyzed to generate predicted frames that are likely to occur following the current frames. The predicted frames are stored in a prediction frame buffer and used to fill any gaps in subsequent frames representing subsequent game state received from the game server.

15 Claims, 10 Drawing Sheets

FILLING IN FRAMES USING PREDICTION FOR WHEN CONNECTION DROPS

FIELD

The present disclosure relates to systems and methods for providing frames of streaming content of a video game, and more specifically to predicting frames that are likely to be generated for the video game for a user, and using the predicted frames to fill gaps in the streaming content.

BACKGROUND

With the growing popularity of video games, game developers are creating video games that can be accessed by users locally or from anywhere. The users are able to enjoy viewing streaming content and interacting with the video games. The video games are played in real-time and the game content generated and streamed live in response to game inputs provided by the user. The game inputs provided by the user are interpreted by game logic of the video game to generate streaming game content reflecting a current game state of the video game. The streaming game content is transmitted to the client device for rendering.

The streaming game content has to be received at the client device without interruption to allow the user to have a truly satisfying game play experience. If some of the frames of streaming content do not make it to the client device, gaps can occur in the game content rendered at the client device. This can lead to the user performing less optimally. The frames of streaming content can get lost or delayed due to insufficient bandwidth or drop in connection between the client device and the server during transmission. Similarly, when the connection is lost or when there is latency due to poor connection, the game inputs provided by the user in response to the game content rendered at the client device may not fully make it to the server leading to the server unable to apply the game inputs to generate the game content for the video game. In addition to gaps in the video portion of the streaming content, there can be gaps in the audio portion as well due to connection drops or latency. Gaps in the audio can be frustrating to the user as the user may be relying on the audio to confirm that a certain activity has occurred within the game scene as they are navigating within the video game. Especially in fast paced games, the user relies on the game content and especially on the audio to assist them to progress in game play.

In order to have a satisfactory game play experience, it is necessary to account for all the frames and audio generated and forwarded by the server and the game inputs provided by the user.

It is in this context that embodiments of the invention arise.

SUMMARY

Implementations of the present disclosure relate to systems and methods for providing streaming content of a video game to client devices for rendering. The content that is streamed includes game data that is used to reconstruct the game scenes of the video game for a user, based on the game inputs provided by the user. During streaming of game content, the connection between the server and the client device can sometimes be lost, due to number of reasons. For example, the connection between the client device and the server may experience intermittent network connection drops, due to high network traffic or network equipment failure or equipment degradation or transmission errors due to interference or due to high data usage from other devices in the geo location. Due to the connection loss, some of the game content generated at the server may not be transmitted, resulting in gaps in the game content received at the client device for rendering. The gaps in the game content can also include drop in audio component. Alternately, due to high network traffic, there can be latency in transmitting the frames of game content and/or the audio, leading to a delay in determining the current game state of the game. Depending on the type of video game being played and the amount of content that is being generated, these gaps can significantly affect the user's game play. For example, the gaps in the streaming content can result in the user not being aware of the current game state and, as a result, delay providing timely game inputs. Similarly, gaps in audio can result in the user not being able to verify or confirm that a certain activity for which the user provided inputs, has occurred in the video game.

To avoid such issues, the server usually keeps track of the data packets sent to the client device. The tracking is usually done by the server by pinging the client device periodically during game play of the video game. Depending on the transmission protocol adopted for transmitting data between the server and the client device, when a gap is detected in the game content transmitted to the client device currently, the server is directed to re-generate the portion of the game content and transmit to the client device. This can cause latency in rendering the game content at the client device leading to significant degradation in user experience.

To optimize the user experience and to ensure that the streaming content provided to the user is without any gaps, a set of predicted frames of the game data is generated at the client device. The predicted frames are generated to include game data representing subsequent game state from the game data received from the server, wherein the game data from the server includes current game state. The predicted frames thus generated are stored in a prediction frame buffer and used to fill any gap in subsequent streaming content representing the subsequent game state received at the client device. To assist in generating the predicted frames, the game data representing the current game state is stored in a buffer, such as a rendering pipeline, at the client device. The buffered game data is analyzed to predict the subsequent set of frames of game data that is likely to be generated in the video game. The analysis is done at the client device using current context and content included in the frames of the game data stored in the rendering pipeline at the client device prior to forwarding the frames of game data to the display screen of the client device for rendering. The predicted set of subsequent frames are generated and stored in a prediction frame buffer before the current set of frames are forwarded to a display screen for rendering and before the subsequent set of frames are received from the server. As and when a gap is detected in the subsequent set of frames received from the server, select ones of the predicted frames stored in the prediction frame buffer are identified and used to fill the gap.

To reduce the amount of data stored in the different buffers, a number of predicted frames generated to represent subsequent game state are less than the number of frames of game data representing the current game state received from the server. Further, the predicted frames generated to represent the subsequent game state are stored in the prediction frame buffer for a period of time the frames of game data representing the current game state is stored in the buffer (e.g., rendering pipeline), for example. Once the frames representing the current game state are forwarded to the display screen for rendering, the frames representing the current game state are deleted from the buffer (i.e., rendering pipeline) to make way for frames representing the subsequent game state transmitted by the server. In addition to deleting the frames including the current game state, the predicted frames including the subsequent game state are also deleted from the prediction frame buffer to make way for a new set of predicted frames generated using the frames representing the subsequent game state received from the server and stored in the prediction frame buffer. This allows the client device to become more proactive in generating predicted frame buffer to include subsequent game state, detecting any gaps in subsequent frames of data representing the subsequent game state received from the server, and using the predicted frames to fill the gaps rather than wait for the data to be generated and transmitted by the server.

The predicted frames are generated periodically and can correspond with the period at which the frames of game data representing current game state are replenished in the rendering pipeline (i.e., buffer). Further, in some implementations, the number of predicted frames generated from the frames of game data is less than the number of frames of game data. As a result, the number of predicted frames used to fill any gaps in the subsequent frames representing the subsequent game state received from the server may be less than the number of frames lost due to connection loss. This could lead to slowness in rendering of the frames of game data that includes the predicted frames at the display screen. However, this might be temporary and short-lived and may be preferred than not having any frames to fill the gap, during rendering.

In one implementation, a method for providing streaming content of a video game at a client device for rendering, is disclosed. The method includes receiving frames of streaming content for rendering at the client device. The frames include streaming content that represent a current game state of the video game. The frames are received from a server executing the video game and are stored in a compressed frame buffer (also referred to as "receive prediction buffer (RPB)") at the client device prior to forwarding to a display screen associated with the client device for rendering. The frames of streaming content stored in the compressed frame buffer are analyzed to generate predicted frames representing a subsequent game state that are likely to be generated for the video game following the frames of streaming content. The generated predicted frames are stored in a prediction frame buffer. A gap is detected in the subsequent frames of streaming content received from the server at the client device. response to detecting the gap, select ones of the predicted frames identified from the prediction frame buffer are used to fill the gap in the subsequent frames of streaming content. The subsequent frames of streaming content with the select ones of the predicted frames filling the gap are forwarded to the display screen of the client device for rendering. The select ones of the predicted frames are identified to include streaming content that is contextually relevant to fill the gap in the subsequent frames of streaming content.

In an alternate implementation, a method for receiving game inputs for a video game executing on a server is disclosed. The method includes receiving game inputs from a client device associated with a user during game play of the video game. The game inputs are applied by game logic to update a current game state of the video game and to generate streaming content that represents the current game state of the video game, wherein the streaming content is forwarded to the client device for rendering. The game inputs are stored in an input buffer at the server. The game inputs stored in the input buffer are analyzed to generate predicted inputs that are likely to be provided by the user as subsequent game inputs following the game inputs to advance to a subsequent game state of the video game. The predicted game inputs that are generated are stored in a prediction input buffer at the server. A drop in connection between the server and the client device is detected during game play of the video game. The drop in connection results in the server missing one or more of the subsequent game inputs transmitted by the client device and stored in the input buffer. The missing of one or more of the subsequent game inputs at the server causes a gap in the streaming content representing a subsequent game state generated for the video game by applying the subsequent game inputs. In response to detecting the drop in the connection at the server, select one or more of the predicted game inputs stored in the prediction input buffer are identified and provided to fill the missing one or more of the subsequent game inputs in the input buffer. The subsequent game inputs with the select one or more of the predicted inputs are forwarded to the game logic for updating the current game state of the video game to the subsequent game state and to generate the streaming content represent the subsequent game state, without the gap, for the video game. The streaming content representing the subsequent game state forwarded to the client device for rendering at a display screen associated with the client device.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which.

DETAILED DESCRIPTION

Figure 1A:
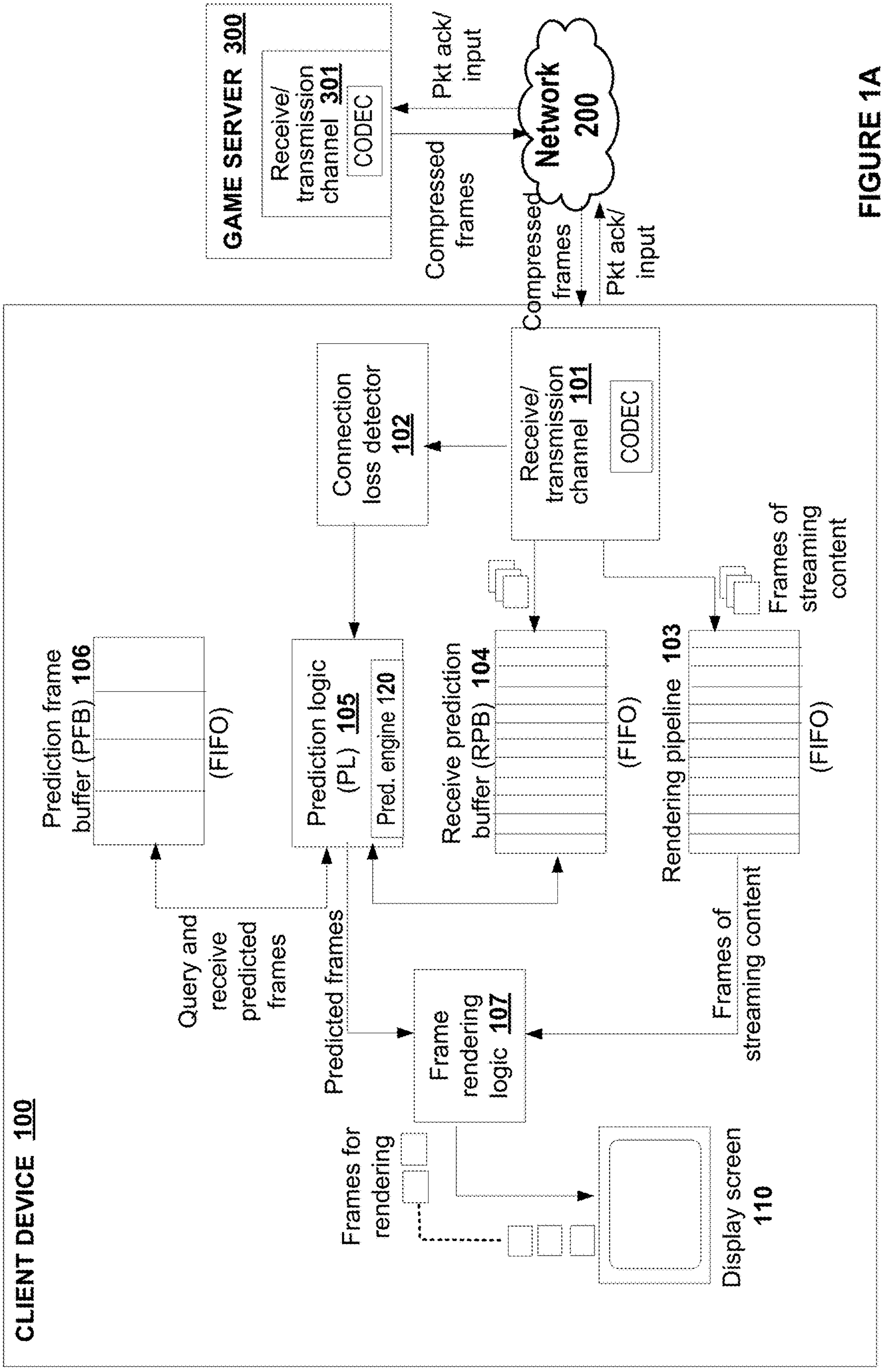
FIG. 1A is a simplified representation of various components of a client device that is part of a system used to provide streaming content of a video game for rendering at the client device, in one implementation.

Systems and method for providing streaming content of a video game are described. It should be noted that various implementations of the present disclosure are practiced without some or all of the specific details. In other instances, well known process operations have not been described in detail in order not to unnecessarily obscure various embodiments of the present disclosure.

The various implementations described herein allow game content of a video game to be streamed from a server to a client device for rendering and game inputs provided by a user at the client device are transmitted to the server to update game state of the video game. The updated game state is used to generate subsequent game content. The game content that is streamed is rendered without any gaps and the game inputs of the user provided to the game logic are provided without any loss in the game inputs.

The video games that are currently available are typically executed on a remote server with the server providing all the resources for instantiating the video game and providing game content. One or more client devices of the users are used to connect to the remote server to access the video game and to provide the users' game inputs that are used to update state data of the video game. Since the majority of the resources required for game play of the video game are provided by the server, the client device needs minimal resources to access the instance of the video game, provide the game inputs, and to receive state data representing the game state of the video game. The state data is generated and updated by the game logic by applying the game inputs of the users. The state data includes details of the users' game inputs and the game state for generating streaming game content. The state data and the streaming game content are generated at the server. The streaming game content is forwarded to the client device for rendering. The streaming game content has sufficient details that can be used to re-create the game scenes representing a current game state of the video game at the client device.

During streaming of game content, when the connection between the client device and the server is lost or experiences latency, there can be a gap in the frames of game content streaming from server to the client device. Similarly, the game inputs provided by one or more users transmitted from the client device to the server can also get lost or delayed during the time of connection loss or communication latency. The loss in the game inputs of a user can result in the server not being able to update the game state leading to delay and/or discontinuity in the game content generated for the video game and in the game inputs provided by the user. In some implementations, when the video game is a multi-user game and the video game is played amongst a plurality of users, the loss in connection or latency can be between a client device of a particular user and the server while no connection losses or latencies are experienced between the client devices of other users and the server(s). To avoid the delay and to ensure there are no gaps in the data (game content, game inputs) exchanged between the client device of any user and the server, a prediction engine is provided at each of the client devices and at the server. The prediction engine at each client device can be used to predict subsequent frames of game content that are likely to be generated by the server based on the current game state included in the game content streamed to the respective client device and the game inputs originating from the respective client device. The subsequent frames of game content representing the current game state are predicted using the frames of streaming game content that are received from the server and stored in a compressed frame buffer. In some implementations, the subsequent frames of game content are predicted prior to the frames of streaming game content being forwarded to a display screen for rendering. In alternate implementations, the subsequent frames are predicted at the same time or after the frames of streaming game content are forwarded to the display screen for rendering. In the implementations where the subsequent frames are predicted after the streaming game content are forwarded for rendering, the prediction is done prior to discarding of the frames of streaming game content from the compressed frame buffer to make room for subsequent frames of streaming content transmitted by the server. The predicted frames of game content are stored in a prediction frame buffer at the respective client device and used to fill any gap detected in the subsequent frames of game content representing the subsequent game state received at the client device.

Similarly, the prediction engine at the server is used to predict subsequent game inputs that are likely to be provided by each user following the current game inputs provided by the user. The prediction of subsequent game inputs is based on current game state of the video game stored as state data and the current game inputs provided by the corresponding user of the video game stored in input buffer. The predicted game inputs maybe generated prior to or during or after forwarding the game inputs to the game logic for updating the game state of the video game. Since each user can provide distinct set of game inputs to individually advance in the video game, the prediction engine is designed to correspondingly generate distinct predicted game inputs for each user associated with each client device. The distinct set of predicted game inputs generated for each client device (i.e., user) are stored separately in an input buffer maintained at the server and used to fill any gap detected in the subsequent game inputs received from the respective client device. The game inputs are used to update the game state of the video game and to generate the streaming game content for forwarding to the client device for rendering. The streaming game content includes the updated game state of the video game.

It should be noted that the prediction logic at each of the client device(s) and the server(s) are designed to predict subsequent data (either game inputs or the game content) when the connection loss or latency extends for a time period that is equal to or less than a predefined window of the video game. The predefined window is defined to be sufficiently brief (e.g., 1-15 seconds) to allow the prediction engine to correctly predict the game-related data for the video game. Based on the type of video game selected, the video game can evolve fairly quickly during game play due to natural progression of the video game and/or due to game inputs provided by the users. Consequently, the prediction logic cannot be used to reliably predict the frames of subsequent game content or the subsequent game inputs for a longer period of time (e.g., beyond the predefined window).

With the general understanding of the disclosure, specific implementations of providing streaming content of a video game to a client device will now be described in greater detail with reference to the various figures. It should be noted that various implementations of the present disclosure can be practiced without some or all of the specific details. In other instances, well known process operations have not been described in detail in order not to unnecessarily obscure various embodiments of the present disclosure.

FIG. 1A illustrates an example system used for processing and streaming the game content of a video game, in one implementation. The system includes a client device 100 that is communicatively linked with a game server (also referred to as "server") 300 via a network 200, such as the Internet. The client device 100 is associated with a user and is configured to access the game server 300 to select a video game available at the game server 300, and initiate a game play request for the video game. The video game can be a single player video game or a multi-player video game. In the case of a multi-player video game, client devices associated with a plurality of users connect to the game server 300 to play an instance of the video game executing on the game server 300. Each client device 100 is associated with a user and is used to initiate a request for game play of a video game selected for game play. Accordingly, in some implementations, the client device 100 includes necessary resources to connect over the network 200 to the game server 300, initiate a game play request, provide game inputs during game play, and receive game content including current game state for rendering on a display screen associated with the client device 100. Consequently, the client device 100 can be a thin-client computer, a laptop computer, a mobile computing device, a head mounted display, or any other computing device that is capable of connecting to the game server 300 over the network 200 and initiate a request for game play of a video game.

The game server 300 can be an independent server or be part of a game cloud system. The game cloud system includes a plurality of game servers 300 distributed across different geo locations and is configured to host a plurality of video games. Each game server 300 of the game cloud system is configured to execute a single instance of a single video game, a single instance of a plurality of video games, a plurality of instances of a single video game, or a plurality of instances of a plurality of video games. Accordingly, the game cloud system provides the necessary resources for each game server 300 to execute one or more instances of one or more video games.

The game server 300 receives a request for game play of a video game originating from a client device 100, executes an instance of the video game, if an instance is not available, provides access to the instance to the client device for interaction, receives game inputs provided by a user of the client device 100, and applies the game inputs to update game state of the video game. As noted, when the video game is a multi-player game, the game server 300 receives the request for game play of the video game from a plurality of users and provides access to the same instance of the video game to the plurality of users. In alternate implementation, one or more game servers 300 execute a plurality of instances of the video game and provide access to each instance to one or more users. In this case, the game state of the video game is coordinated among the multiple instances of the video game executing on the one or more game servers 300.

The game server 300 receives game inputs from the user at a receive/transmission channel 301, via network 200. The receive/transmission channel 301 receives the game inputs and decompresses the game inputs using a coder/decoder (CODEC) module available within. The decompressed game inputs are then forwarded to a game logic of the video game to generate/update state data. The state data includes game input details, and streaming game content generated to include current game state of the video game by applying the game inputs from the user. The details included in the state data are sufficient to recreate game scenes representing current game state of the video game. The streaming game content is forwarded to the receive/transmission channel 301 to forward to the client device 100 over the network 200. The receive/transmission channel 301 engages the CODEC to compress the streaming game content into frames of game content that are streamed to the client device. The CODEC compresses the streaming game content using any known compression techniques and forwards the frames in accordance to transmission protocol adopted by the game server 300 to communicate with the client device 100.

The compressed frames are received at a corresponding receive/transmission channel 101 available at the client device 100. In some implementations, the receive/transmission channel 101 engages a CODEC to decompress the frames of streaming content transmitted by the game server 300, and forwards the decompressed frames to a rendering pipeline (RP) 103 for storage. The RP 103 stores the frames for a brief time period prior to forwarding to a display screen for rendering.

In the implementation illustrated in FIG. 1A, in addition to the rendering pipeline 103, the frames of streaming content are also forwarded to a receive prediction buffer (RPB) 104 for storage. In some implementations, the RPB 104 buffers the streaming game content representing the current game state for a time frame that the same frames of streaming game content are stored in the RP 103, and is then discarded in response to detecting the frames of streaming game content in the RP 103 being forwarded to the display screen. With the old frames of game content having been removed from the RPB 104, the RPB 104 is ready to receive new set of frames representing a subsequent game state. Consequently, in some implementations, the storage capacity of the RPB 104 is defined to match the storage capacity of the RP 103.

In alternate implementations, the storage capacity of the RPB 104 is less than that of the RP 103. In these implementations, a small set of the frames of streaming content forwarded to the RP 103 is forwarded to the RPB 104, wherein the portion forwarded is identified based on amount of content included in the respective portion of frames. For example, the frames of streaming game content identifying greater number of changes in relation to prior frames are identified and stored in the RPB 104, wherein the greater number of changes would correspond to greater number of activities occurring in the video game. Further, the greater number of changes can be occurring in one or some portions of the frames while the remaining portions of the frames may not experience much changes. As a result, the one or some portions of the frames having the greater number of changes are identified and stored in the RPB 104.

In some alternate implementations, the streaming content received from the server at a corresponding receive/transmission channel 101 is stored in the RP 103 as compressed data. In such implementations, a CODEC is engaged by the RP 103 to decompress the streaming game content prior to forwarding to the display screen for rendering. All of the frames in the RP 103 or some of the frames of streaming content in the RP 103 are stored in RPB 104. Consequently, in such implementations, the RPB 104 is also referred to as "compressed frame buffer" (CFB).

The frames of streaming game content representing a current game state is stored in the RP 103 for a defined period, which is defined to be brief, and upon expiration of the defined period forwarding the frames to a frame rendering logic 107 for onward transmission to a display screen 110 associated with the client device 100, for rendering. In some implementations, the brief period is defined based on the frame rate or transmission time of the streaming game content. In some other implementations, the brief period is defined based on the speed of the video game. In cases where the streaming game content is stored in the RP 103 as compressed frames, decompression of the streaming game content, in some implementations, is done upon expiration of the brief period, and the decompressed streaming game content is transmitted to the frame rendering logic 107 for rendering on the display screen 110. Upon transmission of the frames to the frame rendering logic 107, the frames representing the current game state are discarded from the RP 103 to make way for the frames representing subsequent game state transmitted by the server 300. Simultaneously, the frames of streaming game content in the RPB 104 are also discarded to allow the frames representing subsequent game state to be received therein.

Upon receipt of the frames in the RPB 104 with streaming content representing the current game state, the frames of streaming content are analyzed by a prediction logic 105 to generate a set of predicted frames of game content representing subsequent game state that is likely to occur in the video game. In some implementations, the analysis of the frames in the RPB 104 is done after decompressing the frames using a CODEC available within the RPB 104 or by relying on the CODEC available to the RPB 104. The prediction logic 105 engages machine learning (ML) engine to generate the predicted frames at the client device 100, wherein the ML engine uses the current game state included in the frames received at the client device 100 to predict the subsequent game state of the video game. As noted, the current game state is determined at the game server 300 by applying the game inputs provided by the user and the frames of streaming game content including the current game state are forwarded from the server 300 to the client device 100. When the video game is a multi-player video game, the game inputs of each user are considered to determine current game state of the video game. The game inputs of each user represent a small portion of the overall game inputs that influence the current game state. The overall game inputs are applied by the game logic of the video game to generate the current game state. For instance, the frames of streaming game content forwarded to the client device 100 of each user include the overall current game state as a result of applying the game inputs provided by the respective user during game play and includes details of the game scene from the perspective of the user. As a result, the predicted frames of game content generated by the ML engine at the client device are user specific, in that the predicted frames of game content representing subsequent game state are generated by considering the current game inputs of the specific user and include the predicted frames of game content from the perspective of the specific user. The predicted frames of game content generated for each user are stored in the prediction frame buffer (PFB) 106 and used when a gap is detected in frames of streaming game content representing a subsequent game state received from the game server 300. In the multi-player video game, the gap in the frames can be experienced by one or more users of the multi-player video game and the predicted frames of game content corresponding to each user are used to fill the respective gap for each user.

In some implementations, the number of predicted frames generated from the frames of streaming game content in the RPB 104 and stored in the PFB 106 is less than the number of frames in the RPB 104. The number of frames stored in the RPB 104 is based on the frame rate defined by the transmission protocol used to stream the game content from the server 300 to the client device 100 and the number of predicted frames generated and stored in the PFB 106 is a portion of the frames. In some implementations, the predicted frames are generated to include frames with the highest amount of changes capturing the greater number of activities that are likely to occur following the frames representing the current game state, during game play of the video game. Predicting to include frames with the greatest number of activities is more useful to fill any gaps in the subsequent frames as it will assist in rendering game content that will provide a more complete picture of the game play of the video game, even when the number of predicted frames selected to fill any gap is less than the number of frames that make up the gap.

In alternate implementations, the number of predicted frames generated from the frames of streaming game content in the RPB 104 and stored in the PFB 106 is less than the number of frames in the RPB 104.

The frames received at the receive/transmission channel 101 of the client device 100 are constantly monitored by a connection loss detector 102 to determine if the frames are being received without any gaps. The connection loss detector 102 can determine the connection loss or latency using ping or traceroute or other tools and to pinpoint the reason of the loss/latency as due to network issues or transmission issues at the server 300 or reception issues at the client device 100 or bandwidth demand. The connection loss or latency can result in a gap in the frames of streaming game content received at the client device 100. When a gap is detected in the frames of streaming game content representing subsequent game state transmitted by the server 300, the connection loss detector 102 triggers a signal to the prediction logic 105. The prediction logic 105 responds to the triggered signal by querying the prediction frame buffer 106 and receiving relevant predicted frames representing the subsequent game state that is likely to occur in the video game. The query initiated by the prediction logic 105 may identify the context of the frames representing the subsequent game state that is received and the location of the gap within the frames representing the subsequent game state so that appropriate predicted frames can be retrieved from the PFB 106 to fill the gap. The predicted frames retrieved from the PFB 106 are forwarded to the frame rendering logic 107.

The frame rendering logic 107 is configured to format the frames of streaming game content for the display screen 110 and forward the formatted frames to the display screen 110 for rendering. When a gap is detected in the frames including the subsequent game state, the frame rendering logic 107 receives the predicted frames from the prediction logic 105, the frames of streaming game content representing the subsequent game state from the RP 103, and uses the predicted frames to fill the gap in the frames of streaming game content representing the subsequent game state during formatting and prior to forwarding the formatted frames of subsequent game state for rendering at the display screen 110. The predicted frames are generated at the client device 100 to fill the gaps detected in the frames received at the client device 100, thereby reducing latency that may be incurred if the frames to fill the gap had to be re-transmitted from the game server 300. As noted before, in the case of multi-player game, the predicted frames for each user are identified and included to fill the gap in the frames representing the subsequent game state for that user. In some implementations, the predicted frames identified to fill the gap are selected so as to include game content that are contextually relevant for the gap for the user, as the gap can be experienced by certain user while the remaining users may not experience any gaps in the streaming content.

Figure 1B:
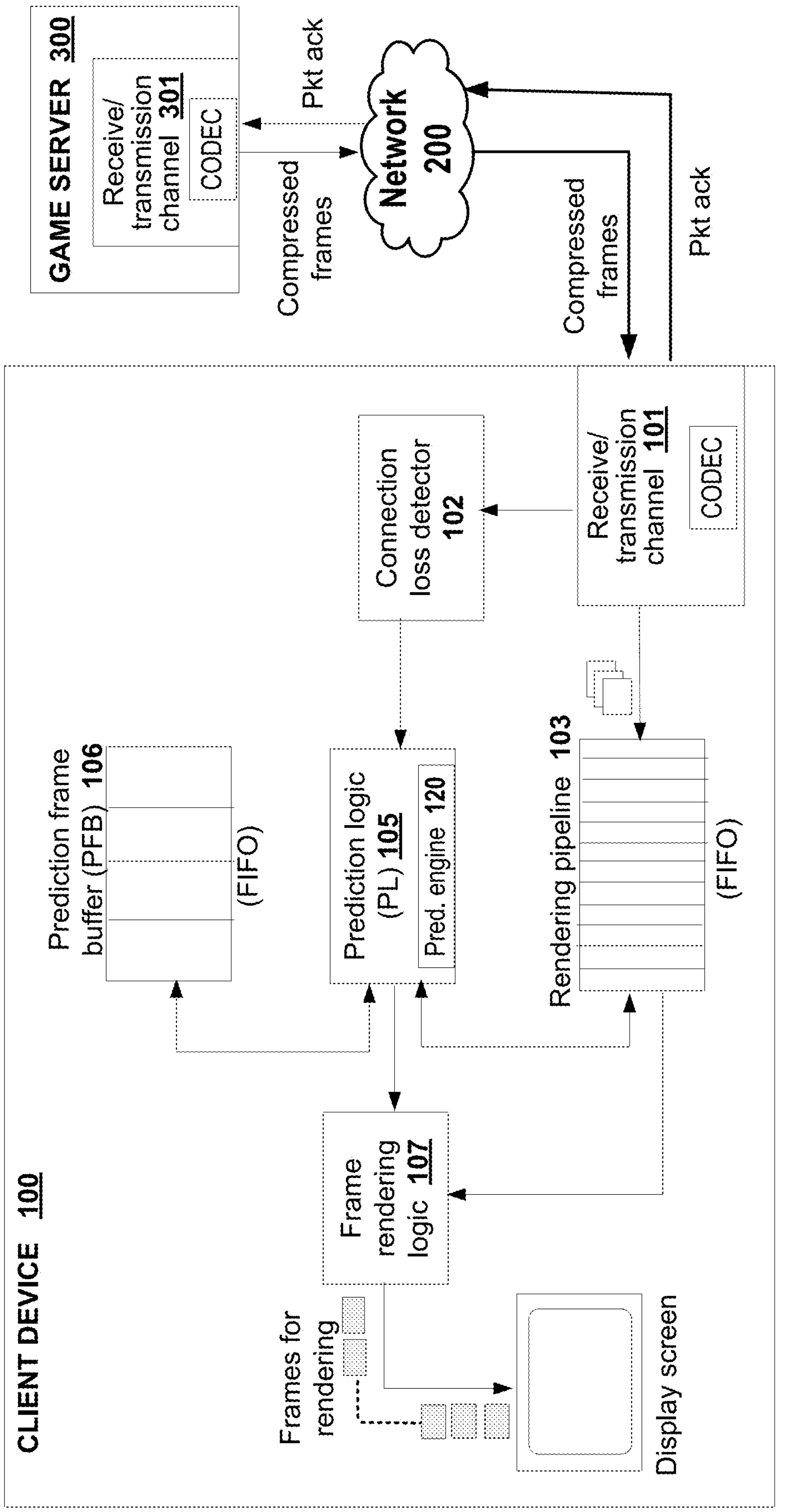
FIG. 1B is a simplified representation of various components of a client device that is part of a system used to provide streaming content of a video game for rendering at the client device, in an alternate implementation.

FIG. 1B illustrates a variation in the system configuration representing in FIG. 1A, in an alternate implementation. The variation is within the various components included in the client device 100 used to receive, store and render streaming game content transmitted by the game server 300. As shown in FIG. 1B, the frames of streaming game content received from the game server 300 is stored in RP 103 and is used by the prediction logic 105 to generate the predicted frames representing the subsequent game state that is likely to occur following the frames representing the current game state. As each user may be provided with their own perception of the current game state, the predicted frames for subsequent game state are user specific. In the implementation illustrated in FIG. 1B, the need to store the streaming game content in an additional buffer (e.g., RPB 104) is eliminated. This results in optimal use of memory in the client device 100, as it eliminates a need to maintain additional buffer for storing the game content streamed from the game server 300. Apart from eliminating the need for maintaining a separate RPB 104 for storing the streaming game content, all the remaining components of the client device 100 shown in FIG. 1B are similar to and function the same way as the components shown in FIG. 1A.

Figure 2:
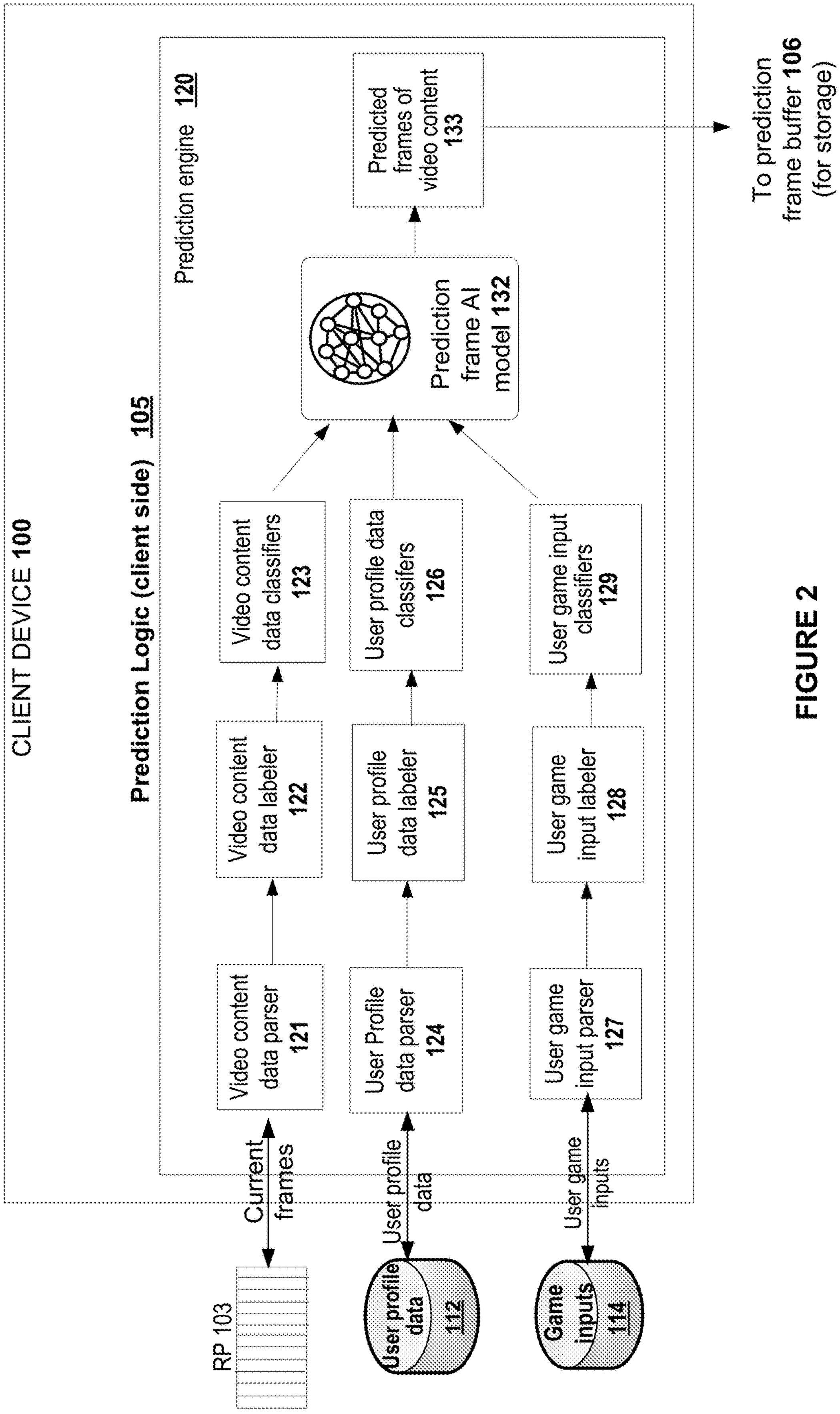
FIG. 2 illustrates an example prediction logic of the client device used to generate predicted frames of game content including subsequent game state using frames of content representing current game state, in one implementation.

FIG. 2 illustrates components of a prediction engine (a machine learning (ML) algorithm/engine) 120 at the client device 100 engaged by the prediction logic 105 for predicting frames of game content representing subsequent game state (also referred to henceforth as "predicted frames") that are likely to occur following streaming game content representing the current game state (referred to henceforth as "current frames"), in one implementation. The prediction engine 120 includes a plurality of components to analyze the current frames forwarded by the game server 300 to the client device 100 and to generate the predicted frames. The current frames are generated at the server 300 from state data maintained for the video game, wherein the state data is updated by game logic by applying game inputs provided via the respective client devices by one or more users engaged in game play of the video game. The state data includes the game inputs of the one or more users and the game content defining the current game state generated from applying the game inputs of the one or more users. Frames of streaming game content representing the current game state are generated from the state data, wherein the frames include sufficient details to construct game scenes for rendering at the client device 100. Since the game scenes are rendered at each client device associated with a user from the perspective of the user, the frames of streaming game content are generated to include the streaming content from different users' perspectives. Some of the components in the prediction engine 120 include a video content data parser 121, a video content data labeler 122, one or more video content data classifiers 123, user profile data parser 124, user profile data labeler 125, one or more user profile data classifiers 126, user game input parser 127, user game input labeler 128, one or more user game input classifiers 129, and prediction frame AI model (also referred to as "prediction AI model") 132. Each of the components of the prediction engine 120 can be a hardware component or a software component. To illustrate, each of the video content data parser 121, video content data labeler 122, the one or more video content data classifiers 123, user profile data parser 124, user profile data labeler 125, one or more user profile data classifiers 126, user game input parser 127, user game input labeler 128, one or more user game input classifiers 129, and prediction AI model 132 is a software program or a portion of a software program that is executed by an artificial intelligence (AI) processor (not shown) within the client device 100 or by the processor of the client device 100. To further illustrate, the prediction AI model 132 is a machine learning model or a neural network or an artificial intelligence model. As another illustration, each of the video content data parser 121, video content data labeler 122, video content data classifiers 123, user profile data parser 124, user profile data labeler 125, user profile data classifiers 126, user game input parser 127, user game input labeler 128, one or more user game input classifiers 129, and prediction AI model 132 is a hardware circuit portion of an application specific integrated circuit (ASIC) or a programmable logic device (PLD). The client device 100 is communicatively connected to the game server 300 via the network 200 and receives the game content of the video game streamed from the game server 300 in real-time. In one example, the game server 300 can be part of a cloud system. In another example, the game server 300 can be a standalone server.

Each of the parser components is coupled to corresponding labeler, which is coupled to corresponding one or more classifiers. To illustrate, the video content data parser 121 is coupled to the video content data labeler 122, which, in turn, is coupled to one or more video content data classifiers 123. Output of the one or more video content data classifiers 123 is forwarded to the prediction AI model 132 for defining predicted frames 133. Similarly, user profile data parser 124 is coupled to user profile data labeler 125, which, in turn, is coupled to one or more user profile data classifiers 126. Output of the user profile data classifiers 126 is forwarded to the prediction frame AI model (or simply referred to interchangeably as "prediction AI model") 132 for defining predicted frames 133. User game input parser 127 is coupled to user game input labeler 128, which, in turn, is coupled to one or more user game input classifiers 129. Output of the one or more user game input classifiers 129 is forwarded to the prediction AI model 132 for defining predicted frames 133. The classifier data from the different data classifiers (123, 126 and 129) are used to generate and train the AI model. Output from the trained AI model identifies the predicted frames 133 that are likely to occur following the current frames. The predicted frames 133 thus generated are forwarded to the prediction frame buffer 106 for storage and for use to fill any gaps in the subsequent frames of game content received from the server 300.

In some implementations, the generated AI model maybe updated based on observations of the game state of the video game and the user behavior during game play, as captured in the game inputs of different users. The updated/refined AI model is then used to identify a specific user's behavior from the plurality of users' behavior used to build and refine the AI model to identify personality of a specific user that a second user's behavior closely emulates and use the outcome of the specific user's game inputs or behavior to predict the subsequent game state for the second user.

When a user initiates a request identifying a video game for game play, the user provides user credentials to the game server 300 and selects a game title associated with the video game from a user interface on the client device 100. The game server 300 validates the user using the user credentials provided by the user against user profile data of the user stored in a user profile datastore 112. The user profile datastore 112 stores user profiles of a plurality of users who use the game server 300 for interacting with one or more video games. The game server 300 is part of the cloud system and can be accessed from any geo location. The user profile of the user includes details of the user including user identifier, biometric data, game/interactive content preferences, user skills, user status, user customizations, etc. Upon successful validation of the user and their request, the user is provided access to an instance of the selected video game for game play. Game inputs provided by the user are used to update game state and generate state data for the video game. The state data, which includes the game inputs and the current game state is used to generate game content that is streamed to the client device 100 of the user. The game content streamed to the client device 100 includes sufficient detail to generate game scene of the video game for rendering at the client device 100. The game content streamed to the client device 100 is stored in a rendering pipeline 103 and, in some implementations, in a receive prediction buffer (RPB) 104 for buffering before forwarding to a display screen 110 associated with the client device 100 for rendering.

The prediction logic 105 available on the client device 100 analyzes the streaming game content stored in the RPB 104 (from the implementation illustrated in FIG. 1A) or the RP 103 (from the implementation illustrated in FIG. 1B) to determine the context of the video game and to generate predicted frames. Toward this end, the prediction logic 105 engages the prediction engine 120 to perform the analysis of the streaming game content in the RPB 104. A video content data parser 121 within the prediction engine 120 is used to parse the video content included in each of the current frames to identify various game play related data included within. The video content data parser 121 reads the game content in the RP 103/RPB 104 and distinguishes the game play related data (i.e., game scene content) from game inputs of the user (i.e., user interactions) included in the game content. The video content data parser 121 then further distinguishes the various game play related data included in the game content based on the characteristics. As an example, the video content data parser 121 parses the game play related data to identify game level, game content included in each frame, game context, game scenes, game objects, game characters, and changes occurring within the game scene including changes to game objects and game characters from a previous frame, current game state, etc., from which current game state can be determined. Further, each game object/game character can be distinguished from one another by inherent or exhibited characteristics, including shape, size, color, type (motion/stationary), action capability, etc. The prediction engine 120 then engages a video content data labeler 122 to assign a distinct identifier for each of the game play related data identified by the video content data labeler 122. To illustrate, the video content data labeler 122 will generate a distinct identifier (i.e., label) for each game object/game character included in each frame, and include frame identifier, game context descriptor, each game object/game character identifier, game scene identifier, etc. In one example, each label is generated as a distinct sequence of alphanumeric characters that can be used to distinguish one label from another. Further, each game related data (e.g., game object or game character) can include a plurality of labels, wherein each label can be generated for each distinct characteristic.

The one or more video content data classifiers 123 receive the labels of the game related data identified by the video content data labeler 122 and classify the game related data to output respective classifications. In some implementations, each game related data can include more than one label, wherein a distinct label can be generated for each distinct characteristic. Consequently, each of the game related data can be classified in different ways, depending on the number of distinct labels assigned to it. For example, a game character can include labels to correspond with the game character identifier, type identifier, the scene identifier for the game scene where the game character appears, level identifier for the game level where the game character appears, etc. In some cases, the game character can appear in more than one game scene or game level and the distinct labels distinguish the game character in each game scene or game level. The label details are used to classify the game related data. Where more than one label is used to classify the data, the labels can be prioritized in accordance to pre-defined rule(s) and the classification is done in order of priority of the labels. The game related data includes game objects, game characters and game scenes representing game state from which game context can be easily deduced. One or more of the video content data classifiers 123 are used to classify the game objects to output game object classifications, the game characters classified to output the game characters classifications, and the game context classified to output the game context classifications. The classifications can be done in accordance to the type, location, function and/or influence on the game play, for example.

The prediction logic 105 engages the user profile data parser 124 to parse the user profile data of the user operating the client device 100 and providing game inputs that drive the game state of the video game. The parsing is done to identify the various attributes of the user accessing the game server 300 for game play of the video game. In some implementations, the user profile data pertaining to the user is stored locally in a user profile datastore 112 at the client device 100 of the user and used for parsing. Thus, when the video game is played between a plurality of users, the user profile data of the respective user stored in the corresponding client device 100 can be retrieved and used for parsing and classifying. The prediction engine 120 engages a user profile data labeler 125 to generate label(s) for the user profile data. For example, based on the parsed user profile data, labels can be generated to identify the user as an adult user or a child user, an aggressive player or a gentle player, a fast player or a slow player, an experienced player or a novice player, has aural or visual challenges, etc. The labeling can be done per video game basis and/or per user basis or both. For instance, the user can be labeled to be an experienced player in a first video game and an average or a novice player in a second video game. The user profile data labels are then used by the user profile data classifiers 126 to classify the user for the video game.

Similarly, the prediction logic 120 engages user game inputs parser 127 to parse the game inputs originating from the client device 100 of each user to identify input attributes included in the game inputs provided by the user. For example, the input attributes can include an input source, a target, input type (e.g., button press, swipe, tap, press, etc.), input sequence, magnitude, location and direction, action expected from the game input (e.g., a jump or a walk or a run or a throw or hit or a drive action), etc. The prediction engine 120 then engages a user game input labeler 128 to assign a distinct label for each game input based on the attributes of the game input identified by the user game inputs parser 127. The user game input classifiers 218 are then engaged by the prediction engine 120 to classify the game inputs to output game input classifications.

The prediction AI model 132 is generated and trained using the content and context included in the current frames of the content data stream, the video content data classifications, the user profile data classifications and the user game inputs classifications to identify different outputs targeted for each user. In some implementations, the outputs identified for a specific user is a set of predicted frames of game content representing subsequent game state that are predicted to follow frames of streaming game content representing current game state, and such prediction is based on the consideration of the various game related data classifications. The prediction engine 120 determines the predicted frames by considering the current context and the current content from the current frames classifications, the prior gameplay behavior of the user from the user's game input classifications, and the user's skills, level, expertise in the video game from the user profile data classifications. The number of predicted frames determined can be equal to or less than or greater than the number of current frames stored in the RPB 104 and/or RP 103.

In some implementations, each of the predicted frames is identified to include an amount of content that corresponds to an amount of content included in each of the current frames. For example, during analysis, the current frames can be inspected by the prediction engine 120 to determine the amount of content included in each of the frames. If each of the frames includes a moderate amount of content, then the content of each of the frames is taken into consideration for generating the predicted frames. In some implementations, fewer numbers of predicted frames are generated by taking into consideration the content of all the current frames. In some implementations, the predicted frames are generated at a lower frame rate than the frame rate at which the current frames are transmitted to the client device 100. Alternately, when some of the current frames include very little content and the remaining ones of the current frames include a lot of content, the current frames that have lot of content are used to generate the predicted frames while the remaining ones of the current frames with lesser content are ignored by the prediction AI model 132. This approach is advantageous, since select ones of the current frames that include lot of content have a greater potential of having higher activity, which, in turn, can correspond to potentially greater amount of changes in the subsequent frames generated for the time period following the time period the current frames were generated. Consideration of such frames to generate the predicted frames can result in a more accurate prediction of the subsequent game state for each user of the video game. The predicted frames are generated to include game content from the perception of each user that has participated and/or are present in the current frames of the video game.

In some implementations, the number of predicted frames determined can be greater than the number of current frames stored in the RPB 104 and/or RP 103. In some implementations, the predicted frames are generated at higher frame rate than the frame rate at which the current frames are transmitted to the client device 100. The frame rate enhancement can be used for smoothing, where smoothing improves the frame rate rather than just sustaining the frame rate. The smoothing results in improving resolution of the streaming content not only in the spatial sense, but also in the temporal sense.

The predicted frames determined for the video game are forwarded to a prediction frame buffer 106 at the client device 100 for storage. In some implementations, the predicted frames are identified for every set of current frames received at the RPB 104 and/or the RP 103. Consequently, in these implementations, the prediction frame buffer 106 is replenished as frequently as the current frames are replenished in the RP 103 and, where available, the RPB 104. In alternate implementations, the predicted frames are generated and the PFB 106 replenished less frequently. In some implementations, the predicted frames are identified for every other set of current frames received and stored in the RPB 104 and/or RP 103, or at a pre-defined frequency that is less than the frequency at which the RP 103 is being replenished with the current frames of game content. In some implementations, the frequency of generating predicted frames may be determined based on the quality of connection between the game server 300 and the client device 100. For example, if the connection drop between the game server 300 and the client device 100 is very frequent, then the predicted frames are generated (i.e., determined) at the same frequency the current frames are being replenished at the RP 103. The predicted frames stored in the PFB 106 are used to fill any gaps detected in subsequent frames of game content generated following the current frames.

It should be noted that the predicted frames are suitable for use to fill gaps that occur within a brief time period in the subsequent set of frames following the current frames. The brief time period is defined to be sufficiently short so that the predicted frames generated from the current frames are relevant for inclusion in the game scene that is predicted to be rendered following the current game scene that is created with the current frames of the video game. For example, depending on the game speed of the video game being played, the brief time can be defined to be between about 1 millisecond and few milliseconds or between about 1 second and 3 seconds (e.g., for a high-speed game) or between about 1 second and 10 seconds (e.g., for a slow speed game). As game inputs are being received continually and the game scene is correspondingly evolving during game play (i.e., substantial real-time), the game scene can change drastically from one second to the next. Consequently, trying to use the predicted frames to fill any gap(s) that are beyond the brief time frame can result in the game content included in the predicted frames becoming irrelevant or a mismatch to the game context included in the current frames. This can be because the video game could have evolved beyond the subsequent game state to a more advanced game state. In order to provide relevant predicted frames that are contextually relevant to the subsequent game state, the predicted frames can be generated more frequently and used to fill gaps in the subsequent frames representing the subsequent game state, when such gaps are present in the subsequent frames that immediately follow the current frames. It is to be noted that the RP 103 (of FIG. 1B) and, where available, RPB 104 (of FIG. 1A) buffer the current frames of game content received from the game server 300 while the PFB 106 is used to buffer predicted frames that are identified and generated at the client device 100 using the current frames in the RP 103/RPB 104. In some implementations, depending on the transmission protocol adopted by the server, the frames of streaming game content may be transmitted to the client device 100 out of sequence so as to maximize the use of the communication bandwidth available. In such cases, the frames of streaming game content received at the RP 103/RPB 104 are first arranged in accordance to temporal attributes (i.e., arranged in temporal sequence) and the predicted frames are generated using the temporally arranged streaming game content.

When a gap is detected in the subsequent frames representing subsequent game state, by a connection loss detector 102, the connection loss detector 102 initiates a trigger signal to the prediction logic 105. The gap can be due to connection loss or due to communication latency in the network connection and the trigger signal is generated in response to detecting a cause for the gap in the subsequent frames. Upon receiving the trigger signal from the connection loss detector 102, the prediction logic 105 queries the PFB 106 and receives the predicted frames that include content of game scene that are contextually relevant for the portion of the game content where the gap is detected in the frames of game content representing the subsequent game state. In some implementations where the predicted frames are generated to render at a lower frame rate, inclusion of select ones of such predicted frames would result in the portion being rendered with fewer frames (e.g., at slower speed) than the rest of the frames. However, since the predicted frames are used to fill a gap that is small, the presenting of the predicted frames at the slower speed is for only for a brief period of time after which the subsequent frames are rendered at the normal speed. In some implementations, the fewer number of predicted frames are used to fill the gap than the number of frames that define the gap. Since the gap is small, the fewer number of predicted frames used to fill the gap can go unnoticed or is very brief that will not cause unnecessary hardship to the user. In alternate implementations, the number of predicted frames used to fill the gap is equal to or are greater than the number of frames of streaming content defining the gap.

In some implementations, the predicted frames are stored in the PFB 106 for a defined time period and after expiration of the defined time period, the predicted frames are discarded to make room for subsequent predicted frames. In some implementations, the amount of time the predicted frames are stored in the PFB 106 may correspond with the amount of time the frames of the streaming content are stored in the RP 103 and, where available, RPB 104. The predicted frames are discarded upon detecting the frames of streaming content for the subsequent game state are received in the RP 103, for example. In some implementations, the predicted frames are replenished at the same rate the frames of streaming content are replenished at the RP 103 and, where available, RPB 104. This might be the case where the video game is a fast-paced video game with lot of activities or events occurring within the game scenes of the video game. In alternate implementations, the predicted frames are replenished at a lesser rate than the rate at which the frames of streaming content are replenished at the RP 103 and, where available, RPB 104. In other implementations, the predicted frames are replenished at defined time intervals. The frequency of replenishment may be driven by the quality of communication connection between the server and the client device.

In some implementation, the output identified from the trained AI model can be a playstyle of another user that the specific user can adopt, wherein the playstyle of another user is determined based on a level of similarity of game inputs provided by the specific user and the other user or based on similarity in the user attributes stored in the user profile of the respective users, etc.

Figure 3:
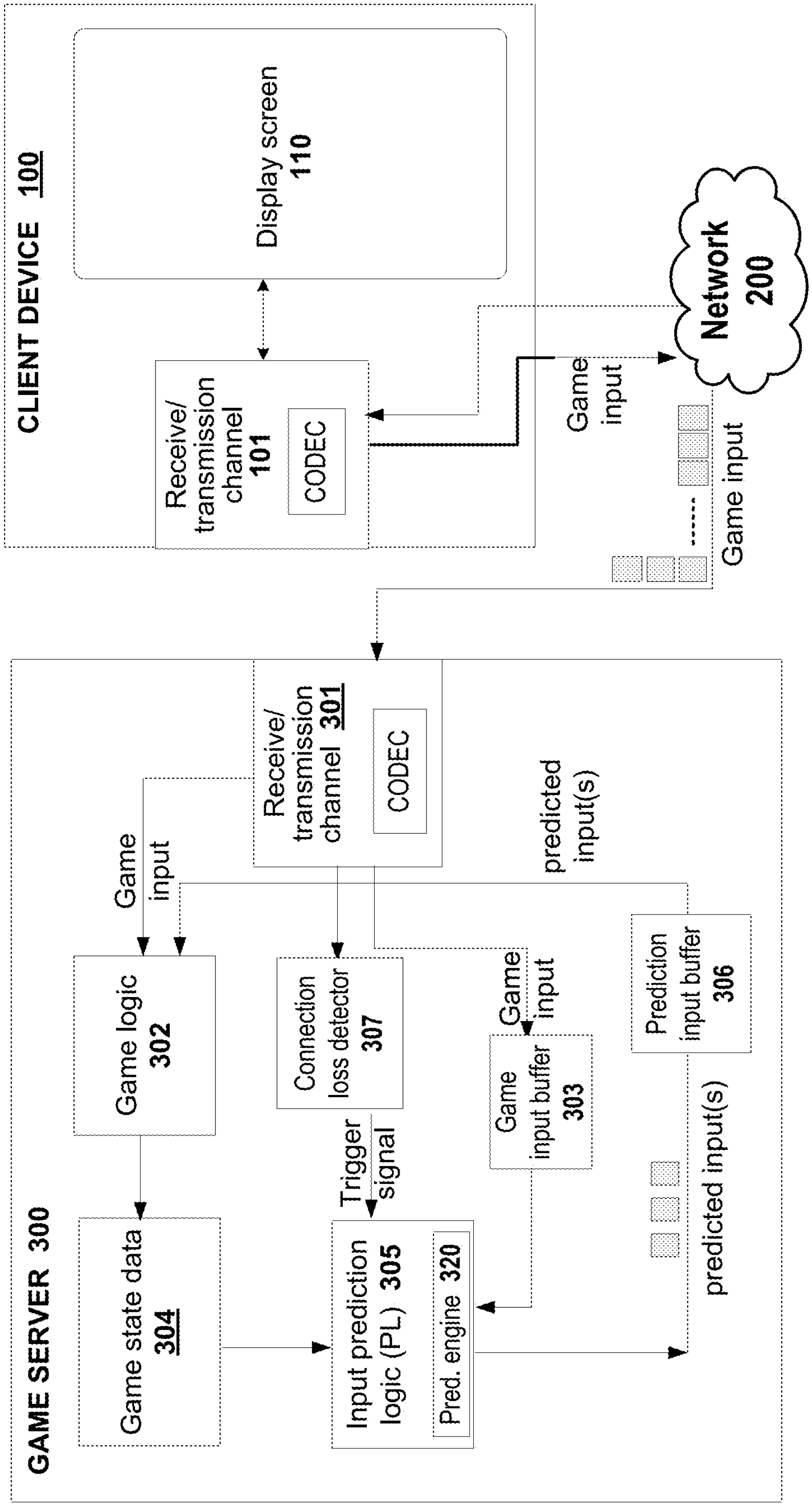
FIG. 3 illustrates a simplified representation of various components of a server that is part of a system used to generate game state data of a video game using game inputs provided by a user, in one implementation.

FIG. 3 illustrates the components of a game server 300 within the system used to predict game inputs generated at one or more client devices of users during gameplay of the video game, in one implementation. The video game can be played in real time and the game inputs generated at the client devices 100 are used to update game state of the video game. The updated game state is used to generate game content that is streamed to the client devices 100 for rendering. Similar to the client device 100, the game server 300 includes a receive/transmission channel 301 used for transmitting game content of the video game to the client device(s) 100 and for receiving game inputs provided by the users at the client device(s) 100. The receive/transmission channel 301 includes a CODEC (server-side) for compressing and packetizing the game content for transmission to the client devices in accordance to transmission protocol adopted for transmitting over the network 200 and for decompressing game inputs received from the client device(s) 100. The decompressed game inputs are forwarded to a game input buffer 303 for storage. In alternate implementations, the compressed game inputs are stored in the game input buffer 303 and the decompression of the game inputs is done using a coder-decoder module (CODEC) included within or available to the game input buffer 303. The decompressed game inputs are forwarded to game logic 302, where the game inputs are applied to update game state and to generate state data for the video game. The state data of the video game is stored in the game state data buffer 304 and continually updated during game play. The game inputs stored in the game input buffer 303 are used in generating predicted inputs. The game inputs received from each client device 100 are in response to game interactions provided by the user using input devices associated with the client device 100. The game input buffer 303 stores the game inputs for a brief period of time before discarding to make way for subsequent game inputs from the client device 100.

In some implementations, the various buffers used to store the current frames and the predicted frames can be part of cache memory of the client device 100, so that the appropriate frames can be retrieved quickly and presented for rendering at the display screen 110. In other implementations, the various buffers can be part of main memory of the client device and retrieved by the processor for generating the predicted frames.

The game inputs stored in the game input buffer 303 are used by the input prediction logic 305 to generate predicted inputs that are likely to be generated by the user following the game inputs generated by the user and stored in the game input buffer 303. The input prediction logic 305 engages a prediction engine 320 to generate the predicted inputs. The prediction engine 320 uses the game inputs in the game input buffer 303 and the state data stored by the game logic in the game state data buffer 304 to determine the predicted inputs that are likely to be provided by a user following the game inputs of the user. As noted, the game inputs may be stored in the game input buffer 303 in a compressed form or in a decompressed form. When in the compressed form, the game inputs are decompressed and then used to determine the predicted inputs. Since each user provides their own game inputs, the predicted input is also generated for each user based on the game inputs provided by the respective user and the state data that is generated by applying the game inputs of the user.

During game play, a connection loss detector 307 continuously monitors the data traffic at the receive/transmission channel 301 either using ping or traceroute or other tools. When the connection loss detector 307 detects a connection drop between the client device 100 and the game server 300 or a connection latency, the connection loss detector 307 issues a trigger signal to the input prediction logic 305. The input prediction logic 305 uses prediction engine 320 to identify predicted inputs that are likely to be provided by the user following the game inputs. The prediction engine 320 uses the state data of the video game to understand the game context, and the game inputs from the user to understand the history of game inputs that the user has provided previously for the different challenges and for different scenarios encountered within the video game and then formulates the predicted game inputs that are likely to be provided by the user. The predicted inputs are stored in a prediction input buffer 306 and forwarded to the game logic, when a gap in the game inputs is detected by the connection loss detector 307 during connection loss. As with the predicted frames, the predicted inputs for the user are useful when the connection drop lasts for a brief period of time. The predicted inputs can be used by the game logic 302 to update the game state and to update state data. The updated game state with the predicted inputs is stored in the game state data 304 and is used to generate game content that is streamed to the client device of the network 200.

Figure 4:
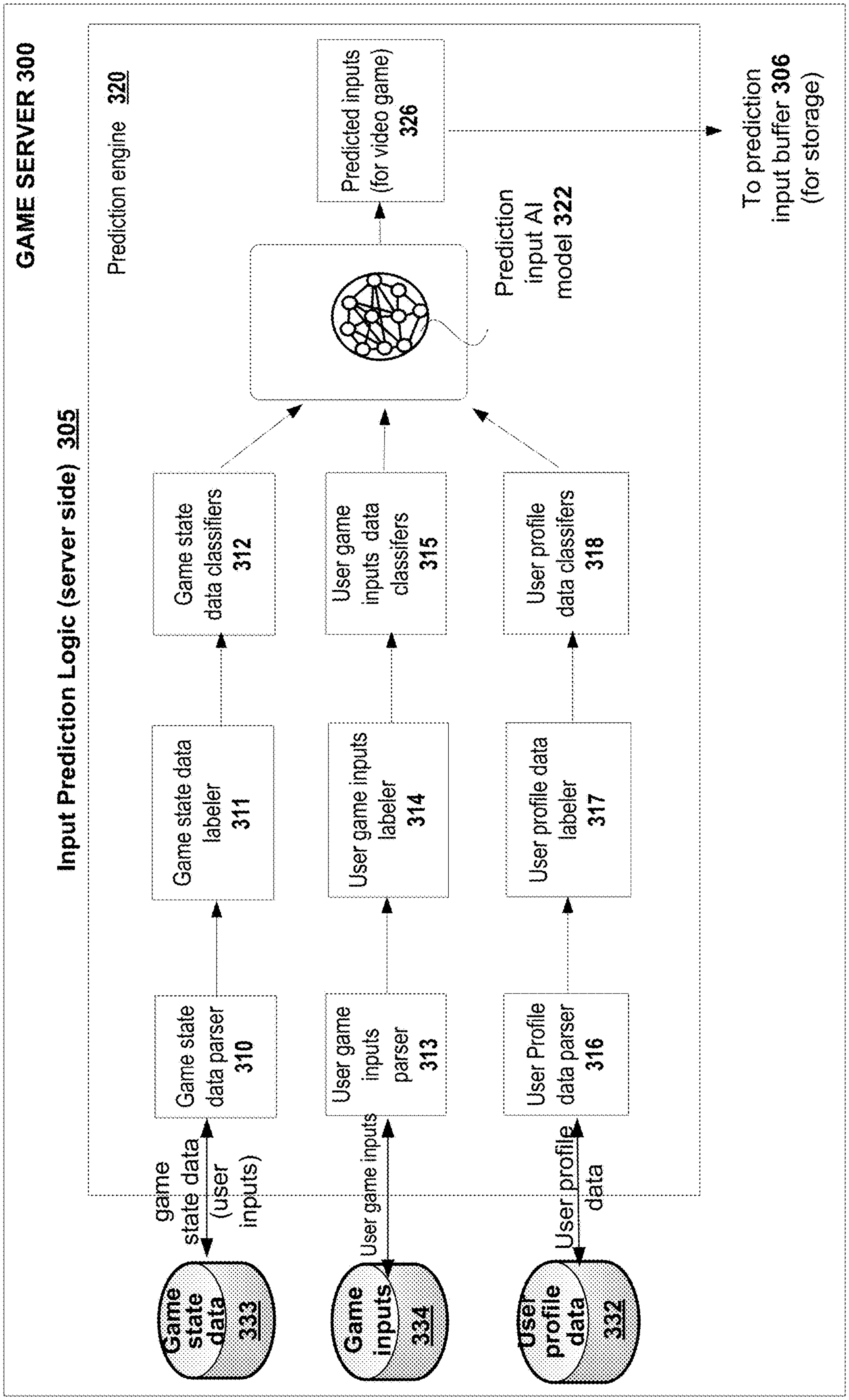
FIG. 4 illustrates an example prediction logic of the server used to generate predicted game inputs of the user using current game inputs of the user, in one implementation.

FIG. 4 illustrates some of the components of the input prediction engine 320 used to identify predicted inputs that are likely to be provided by the user during gameplay of the video game, in one implementation. The components include data parsers that are each coupled to the corresponding labeler, which is, in turn, coupled to the corresponding data classifiers. To illustrate, a game state data parser 310 is coupled to a game state data labeler 311, which is coupled to one or more game state data classifiers 312. Similarly, a user game inputs parser 313 is coupled to corresponding user game inputs labeler 314, which is, in turn, coupled to one or more user game inputs data classifiers 315. User profile data parser 316 is coupled to a corresponding user profile data labeler 317, which is, in turn, coupled to one or more user profile data classifiers 318. Each of the data classifiers (312, 315 and 318) is coupled to a prediction input AI model 322 where the data classifiers and the content data are analyzed to generate predicted game inputs. The generated predicted game inputs are stored in a prediction input buffer prior to forwarding to game logic for updating game state of the video game. Each of the parsers, labelers and classifiers included in the prediction engine 320 can be hardware or a software component. For example, each of the data parsers (310, 313, 316), the data labelers (311, 314, 317) and/or the data classifiers (312, 315, 318), and the prediction input AI model 322 can be a software program or a portion of a software program that is executed by an artificial intelligence (AI) processor at the game server 300. The prediction engine 320 of the input prediction logic 305 can be a machine learning model or a neural network or an AI model. Alternately, each of the data parsers (310, 313, 316), the data labelers (311, 314, 317), the data classifiers (312, 315, 318), and the Prediction input AI model 322 can be a hardware circuit portion of an ASIC or a PLD. The game state data is generated and updated by collecting the game inputs provided by the one or more users during game play and applying the game inputs to the video game.

The generated/updated game state data is stored in the game state datastore 333 and used for predicting the subsequent game inputs that are likely to be generated by the users following the current game inputs. The game inputs generated by the users during game play are stored in the game inputs datastore 334 and used to update the game state data and to predict the subsequent game inputs of each of the users. User profile data of each of the users accessing the video game for gameplay is stored in the user profile datastore 332 and used to validate the user before access to the video game is provided to the user for gameplay. The user profile datastore 332, the game state datastore 333 and the game inputs datastore 334 are stored in a memory device and retrieved by a processor of the game server 300 or another server that is communicatively coupled to the game server, and used to generate the predicted game inputs for the user of the video game. In some implementations, the memory device can be cache memory so as to allow faster retrieval of the relevant data to generate the predicted game inputs during gameplay.

The game state data parser 310 retrieves the state data for the video game from the game state datastore 113 and analyzes the state data to identify the various attributes of the game content included within. The state data includes game inputs provided by the users, the game content corresponding to current game state generated by game logic by applying the game inputs, and the game context of the video game. The game state data parser 310 identifies the game context, the current game state, the game objects, game characters, and other details of the video game included in the state data, etc. Details from the game state data parser 310 is used by the game state data labeler 311 to assign labels. The labels can be assigned for the various attributes of the game content identified by the game state data parser 310. As an example, labels are assigned for the game context, the game objects, game characters, game inputs (i.e., user interactions), game scene, etc. As noted previously, each label that is generated is a distinct data identifier and is represented as a sequence of alphanumeric characters so as to distinguish one label from another.

The one or more game state data classifiers 312 receive the state data labels from the game state data labeler 311 and classify the state data to output state data classifications. For example, the game state data classifiers 312 classify the game context corresponding to the game content included in the current frames to define game context classifications, the game inputs of the users that were applied to generate the game content to define game input classifications, the game characters/game objects included in the current frames to define game character/game object classifications, etc. The state data classifications are provided to the prediction input AI model (simply referred to henceforth as "input AI model") 322 for training the input AI model.

Similarly, user game inputs parser 313 parses each user's game inputs to identify the different attributes of the game inputs. In some implementations, the game inputs generated by the users at the respective client devices are received, decompressed and stored in game inputs datastore 114. In alternate implementations, the game inputs generated by the users are received and stored in the game inputs datastore 114 as compressed game inputs. As and when the game inputs need to be retrieved for affecting the game state of the video game, the game inputs are decompressed and forwarded to the game logic for applying to the video game. In some implementations, the game inputs datastore 114 can be the same as the game inputs buffer 303 of FIG. 3. In alternate implementations, the game inputs datastore 114 is separate from the game inputs buffer 303. The game user game inputs parser 313 retrieves and parses the game inputs to identify the different types and details of game inputs that are provided by the users. As an example, the user game inputs parser 313 can parse the users' game inputs to identify the type of input device/interface used to generate each game input, type of game input (button press, tap, swipe, push, touch, etc.), the user providing the game input, the sequence, location, direction, and magnitude/frequency of the game input, game input origin, game input target, action expected (e.g., jump, walk, run, fly, etc.), resulting action of the game inputs on the different game objects and game characters, etc.

The details from the parser are used by the user game inputs labeler 314 to assign distinctive labels to the game inputs. In some implementations, each game input can be assigned a plurality of labels based on the attributes of the game inputs. The user game inputs data classifiers 315 receives the distinctive labels assigned to the game inputs to classify the game inputs of the users to output game input classifications. For example, the user game inputs data classifiers 315 can classify a game input depending on the type of action or activity occurring in the game scene of the video game, the game character providing the game input, the game object used to provide the game input, or based on game character or game object targeted, etc. The game input data classifications are provided as inputs to the input AI model 322 for training the input AI model 322.

The prediction engine 320 engages the user profile data parser 316 to parse the user profile data of each user operating a corresponding client device 100 and providing game inputs that drive the game state of the video game. The parsing is done to identify the various attributes of the user accessing the game server 300 for game play of the video game. The prediction engine 320 of the input prediction logic 305 engages a user profile data labeler 317 to generate label(s) for the user profile data. The user profile data labeler 317 functions in a manner similar to the counterpart user profile data labeler 125 of the client device 100. For example, based on the parsed user profile data, labels can be generated to identify the user as an adult user or a child user, an aggressive player or a gentle player, a fast player or a slow player, an experienced player or a novice player, experiences aural or visual challenges, etc. The labeling can be done per video game based and/or per user based or both. For instance, the user can be labeled to be an experienced player in a first video game and an average or a novice player in a second video game. The user profile data labels are then used by the user profile data classifiers 318 to classify the user for the video game to output user profile data classifications. The user profile data classifications are forwarded to the prediction input AI model 322 as inputs to train the input AI model 322.

The input AI model 322 uses the various data classifications, the game inputs provided by each user, updated game state data of the video game, user profile data of each user to train the input AI model 322. The output from the trained input AI model 322 is selected for each user identifying subsequent game inputs that are predicted to be provided by the user following the game inputs provided by the user. Game inputs provided by each user are distinct and are used to drive the game state of the video game and generate/update the state data. As a result, the predicted inputs for each user are identified by the input AI model 322 to correlate with their interaction style, the type of input device/input interface preferred for providing the game inputs and the type of game inputs preferred by said user (i.e., determined from game input history of the user), the expertise level of the user (i.e., determined from user profile data), etc. The predicted inputs 326 of each user identified using the trained prediction input AI model 322 is forwarded to a prediction input buffer 306 (of FIG. 3) that is accessible to the input prediction logic 305, for storage. The predicted inputs are used to fill any gaps in the game inputs received from the client device 100 of the respective user, wherein a gap occurs when the connection between the client device 100 of the user and the game server 300 is unreliable (i.e., connection drops, or connectivity issues that cause latency) resulting in the game inputs from the respective client device 100 from not reaching the game server in a timely manner.

By filling the gaps in the game inputs received from the client device 100 of a user using the predicted inputs generated for the user at the game server 300, the state data of the video game can be updated in a timely manner and the game content generated and provided to the user reflects the current game state that are without any disruptions. Further, by predicting the subsequent game inputs of each user at the game server 300, the need to send a request to the client device 100 and to wait for the client device 100 to respond by re-sending the game inputs, is eliminated. For example, during gameplay of the video game amongst a plurality of users, not all users may enjoy good connection between their respective client device and the game server 300. Some users may enjoy good connection while some other users may have issues with the connection. When a client device 100 of a particular user (e.g., user 1) experiences connection issues intermittently, the particular user (i.e., user 1) can be at a significant disadvantage over other users during game play as frames of game content and/or game inputs provided by the particular user (user 1) may not make it to the intended destination (i.e., display screen for the frames, and game server for the game inputs) in a timely manner, leading to the particular user having less than optimal game play experience. To ensure user 1 has an optimal gameplay experience even when user 1 has intermittent connection issues, the various implementations have been described wherein any disruption in the streaming of frames of game content at the respective client device of user 1 is made up using the predicted frames generated at the client device 100 of user 1, and any disruption in the game inputs transmitted from user 1's client device 100 is made up using the predicted inputs generated at the game server 300, leading to an efficient way of ensuring the game content and the game inputs are rendered/applied in a timely manner (i.e., without latency).

In a multi-player video game, the predicted game inputs of each user are determined from current game inputs of the respective user. In some implementations, the predicted game inputs for each user are generated to include input rate that is uniform or similar across all the users. The uniform input rate across all users will introduce a level of fairness for a user having weaker or slower connection, so that the user have equal and fair chance of competing with other users.

It should be noted that the various embodiments described herein for filling gaps in the streaming of frames of game content can also be extended to fill gaps in audio data as well as to address latency issues that usually occur over the communication channel due to high data usage. Usually, audio content uses less data than frames of video content. However, due to data usage, the communication channel can have insufficient bandwidth to transmit even the audio content, leading to gaps in the audio content. Since the audio content uses less data, gaps in audio content also means there will be gaps in the video data as the amount of data to transmit frames of video content is greater than the audio content. Some users may rely on the audio content to compensate for the gaps in the video data. For example, when there is a gap in the frames of video content, a user may rely on audio data to verify or confirm that a certain activity for which the user provided inputs has occurred in the video game. But when there are gaps in the audio content (in addition to the gaps in the video content), the user may not know if their input was accepted and the game state was affected leading to the user having to wait for confirmation of their game inputs. To assist the user to progress in the game, audio content is predicted at the client device 100 of the user in a manner that is similar to predicting frames of video content. The gaps in the audio content are filled using the predicted audio content generated at the client device 100 of the user. The predicted audio content is generated using the current audio content. The user is able to rely on the predicted audio content to progress in the video game.

The predicted video content used to fill the gaps in the frames of video content can also be used to reduce latency. As mentioned before, the video game can be a multiplayer video game and user 1 may experience latency while the other users enjoy good connection and receive the game content in a timely manner. When the latency increases for user 1, the quality of the video game for user 1 deteriorates and user 1 is unable to keep up with the rest of the users. To assist user 1 to have an optimal gameplay experience even when user 1 experiences latency issues, the various implementations have been described wherein the predicted frames generated at the client device 100 of user 1 are used to make up for the delay in receiving frames of game content, thereby enriching user 1's gameplay experience. In some implementations, the predicted frames may be accepted or rejected by the system. For instance, the latency issues may last for a brief period of time after which the original transmission speed may have been restored in the communication channel between the server and the client device 100. Thus, if the connection speed has been restored during a subsequent period, the predicted frames may be ignored and instead the frames of game content generated by the server may be resumed.

Figure 5A:
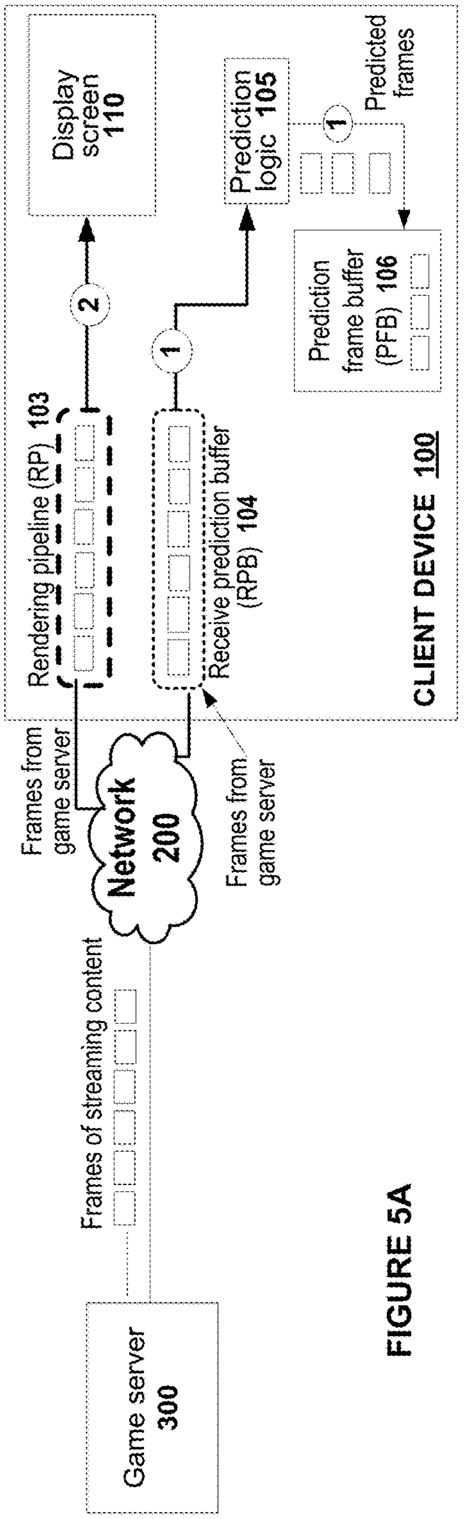
FIGS. 5A and 5B illustrate data process flow followed for generating predicted frames of game content using the various components of the client device of FIG. 1A, in one implementation.
Figure 5B:
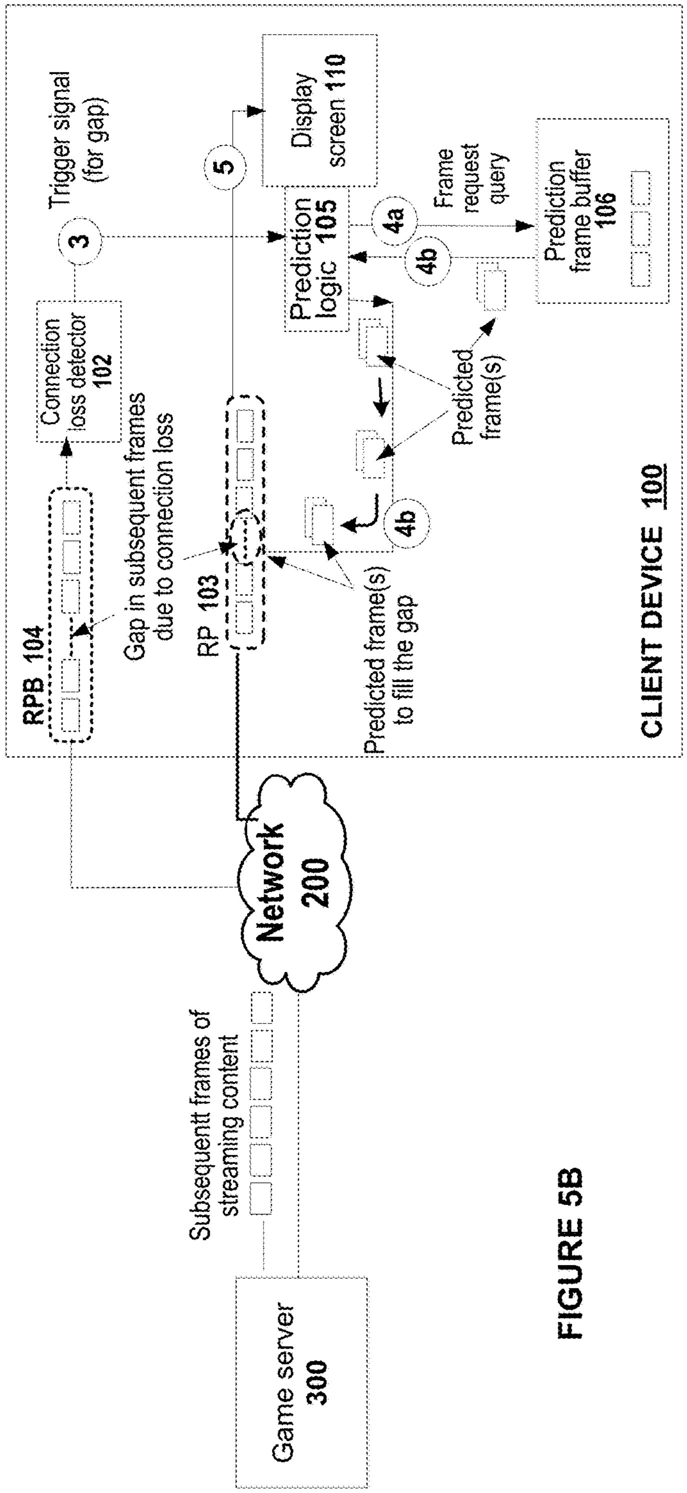

FIGS. 5A and 5B illustrate an example flow of game related data during game play of the video game, in some implementations. The implementations illustrated in FIGS. 5A and 5B correspond with the component configuration of the client device illustrated in FIG. 1A. As illustrated in FIG. 5A, game content generated by applying game inputs of a user to the game logic of the video game, is forwarded to a client device 100 of a user over a network 200 for rendering. In some implementations, the video game is a multi-player video game with a plurality of users accessing an instance of the video game and providing game inputs during gameplay. The game content is compressed and packaged into frames of streaming game content at the game server 300 in accordance to transmission protocol adopted, and streamed to the client device 100. The streaming game content is received at the client device 100, decompressed and initially stored as frames of streaming game content in a content buffer before forwarding to a display screen 110 for rendering. In the illustration of FIG. 5A, the frames of streaming game content are stored in a rendering pipeline (RP) 103 prior to forwarding the frames to the display screen 110 of the client device 100 for rendering. In addition to storing the frames in the RP 103, the frames are also stored in a receive prediction buffer (RPB) 104. The RP 103 and the RPB 104 are temporary buffers for storing the frames of streaming game content, prior to being processed for rendering or generating predicted frames that are likely to occur following the current frames of streaming game content.

The frames in the RPB 104 are analyzed by a prediction logic 105 to determine the game context, the game inputs initiated by the user at the client device 100 and used to generate the game content, and the current game state included in the current frames to determine a set of predicted frames that are likely to occur in the video game following the current frames of game content stored in the RPB 104, as illustrated by bubble 1. The current frames stored in the RP 103 are formatted and forwarded to the display screen 110 of the user for rendering, as illustrated by bubble 2. The set of predicted frames generated are stored in the prediction frame buffer (PFB) 106 and used to fill any gaps in the frames of game content following the current frames received at the client device 100. Once the current frames are forwarded to the display screen 110, the current frames are deleted from the RP 103 and in the RPB 104 to make way for storing the subsequent frames transmitted by the game server 300. Consequently, the set of predicted frames are generated prior to, during or after the frames of streaming game content are forwarded from the RP 103 to the display screen 110 for rendering.

Referring to FIG. 5B, the game server 300 continues to generate and transmit subsequent frames of game content during gameplay of the video game. The subsequent frames are received, processed and stored in the RPB 104 (where available) and the RP 103. The current frames and subsequent frames of game content are separately used to generate predicted frames. As noted before, the predicted frames can be generated as frequently as the frames are replenished in the RP 103 and, where available, RPB 104, or less frequently or more frequently. The frequency of generating the predicted frames can be dependent on the speed of the video game, the amount of content included in each set of frames (i.e., current set, subsequent set), the quality of connection between the client device 100 and the game server 300. Where the video game is a multi-player video game, the predicted frames are generated at the respective client device based on the connection quality between each client device 100 and the game server 300. By localizing the generation of the predicted frames to the respective client devices 100, the predicted frames are generated where needed (i.e., at only those client devices 100 that experience poor connections instead of at each of the client devices) instead of globally at the game server 300.

During game play, when a connection loss or communication latency is detected by the connection loss detector 102, a trigger signal is generated by the connection loss detector 102 and forwarded to the prediction logic 105, as illustrated by bubble 3. The connection loss or communication latency results in a gap in the subsequent frames of game content received from the game server 300. The prediction logic 105, responsive to the trigger signal, initiates a query to the prediction frame buffer 106 for the predicted frames generated for the subsequent game state. The prediction logic 105 initiates the query (bubble 4*a*) by analyzing the subsequent frames received at the client device 100 to determine the game context and game content of the video game and a location of the gap within the subsequent frames resulting from the connection drop or communication latency and includes the details of the game context, game content and the gap location in the query. The prediction frame buffer 106 services the query by identifying and forwarding the predicted frames that are contextually appropriate for the gap location, as illustrated by bubble 4*b*. The prediction logic 105 receives the predicted frames and forwards the same to the frame rendering logic 107. The frame rendering logic 107, during formatting of the frames for onward transmission to the display screen 110, uses the predicted frames received from the prediction logic 105 to fill the gap in the subsequent frames received from the RP 103. The formatted subsequent frames of game content are forwarded to the display screen 110 for rendering, as illustrated by bubble 5. Since the predicted frames are identified based on the context of the game content and the location of the gap, the predicted frames, once integrated in the subsequent frames, will provide a natural progression of the video game to the user, when rendered.

Figure 5C:
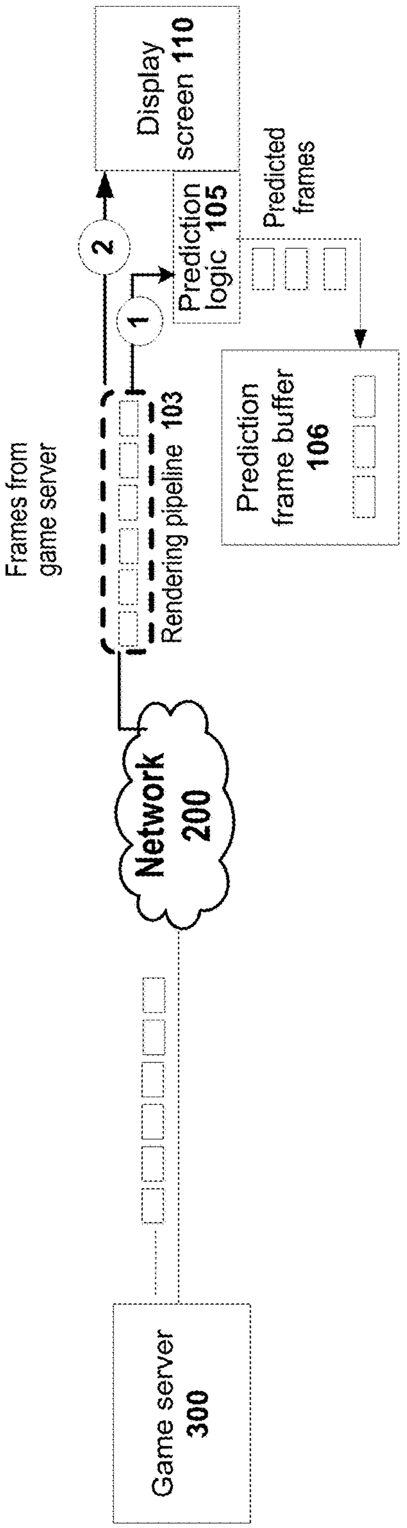
FIGS. 5C and 5D illustrate data process flow followed for generating predicted frames of game content using the various components of the client device of FIG. 1B, in an alternate implementation.
Figure 5D:
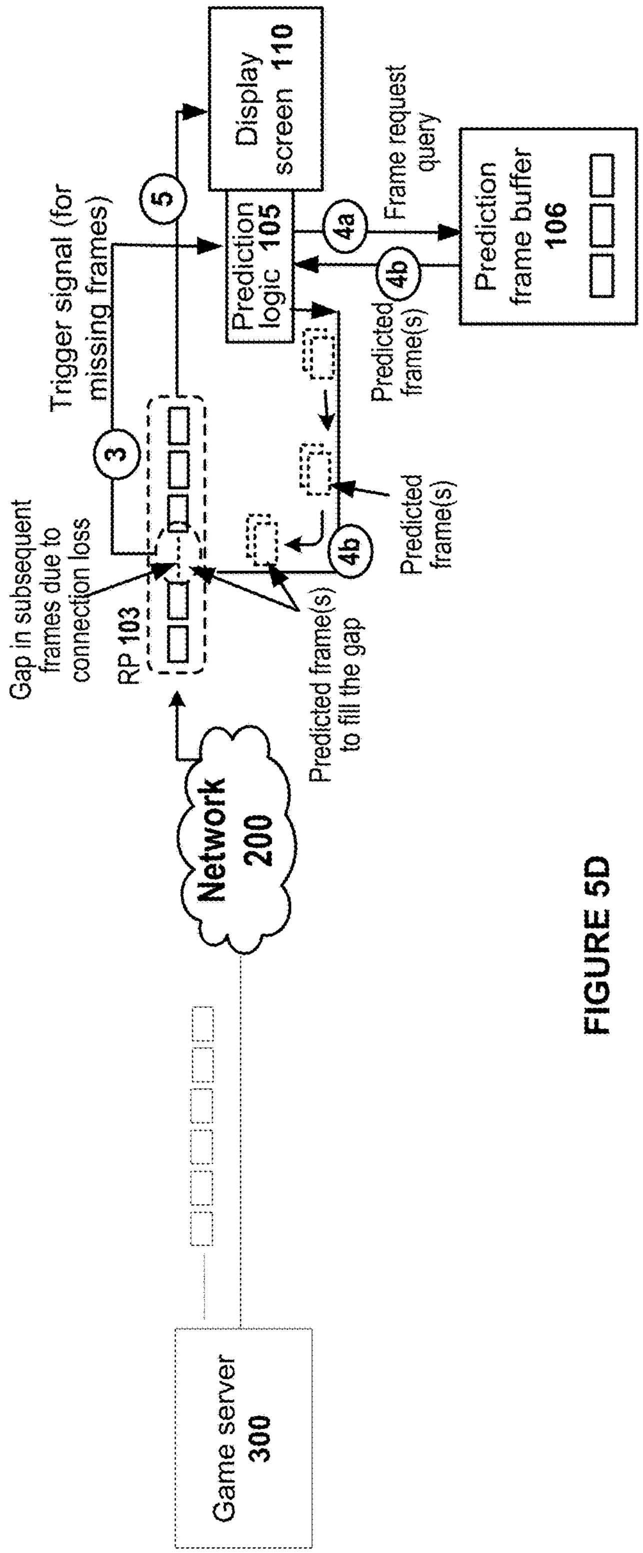

FIGS. 5C and 5D illustrate an example flow of game related data during game play of the video game, in some implementations. The implementations illustrated in FIGS. 5C and 5D correspond with the component configuration of the client device illustrated in FIG. 1B. Consequently, the only difference between the implementations illustrated in FIGS. 5C and 5D and that of FIGS. 5A and 5B is in the storage of the frames of game content. In the implementation illustrated in FIGS. 5A, 5B, the frames of game content streamed by the game server 300 is received and stored in the RPB 104 in addition to being stored in the RP 103. The RPB 104 is used by the prediction logic 105 to determine the predicted frames for the subsequent frames of game content following the frames received in the RP 103. In the implementation illustrated in FIGS. 5C and 5D, the frames of game content are received and stored in the RP 103 and the frames from the RP 103 are used by the prediction logic 105 to generate the predicted frames stored in the prediction frame buffer 106. In this implementation, the need for a second buffer is eliminated, thereby freeing up the space in memory for storing other data.

Figure 6A:
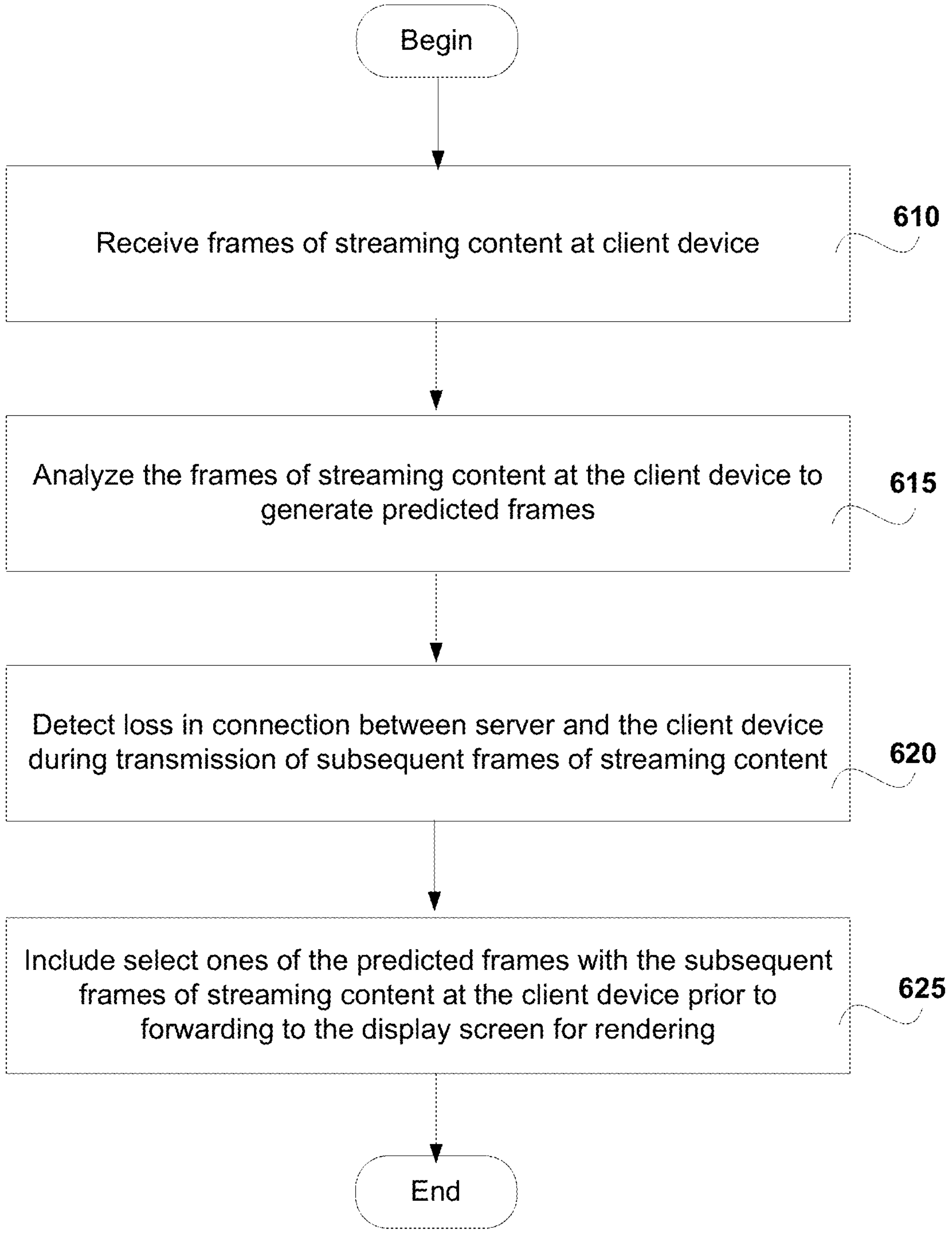
FIG. 6A illustrates operations of a method used for generating predicted frames of game content for use to fill any gaps in subsequent frames of game content received at the client device, in one implementation.

FIG. 6A illustrates flow of operations of a method for providing streaming content of a video game at a client device, in one implementation. The operations of the method illustrated in FIG. 6A are performed by a processor of the client device 100 executing the prediction logic 105. The method begins at operation 710 where frames of streaming game content for a video game originating from the game server 300 is received at a client device of a user, in response to the user selecting the game for gameplay. The frames of streaming game content represent a current game state of the video game and are generated by applying game inputs provided by the user. The streaming game content can be generated by taking into consideration only the game inputs of the user (e.g., for a single-player video game) or by a plurality of users (e.g., for a multi-player video game). The frames of streaming game content representing a current game state are stored in a RP 103 at the client device 100 prior to forwarding the frames to a display screen 110 of the client device 100 for rendering. In addition to storing in the RP 103, in some implementations (e.g., illustration of FIG. 1A) the frames of streaming game content are also stored in RPB 104. The frames in the RP 103 are retrieved and formatted by a frame rendering logic 107 prior to forwarding to the display screen 110 for rendering.

The frames of streaming game content in the RPB 104 are analyzed by the prediction logic 105 to identify the game content and game context of the video game included in the frames, and to generate predicted frames that is likely to occur in subsequent frames following the current frames, as illustrated in operation 615. The predicted frames are generated periodically, wherein the period can be driven by any one or a combination of the frequency at which the RPB 104 is being replenished with newer frames, or the speed of the video game, or the amount of content stored in each set of frames, or the quality of connection between the client device and the game server, etc. The predicted frames generated from the current frames are stored in the PFB 106 and used to fill any gaps detected in the subsequent frames.

During gameplay while the game content is being streamed to the client device from the server, a loss in connection can occur between the client device and the server. The loss in connection can be due to poor network connection or due to insufficient bandwidth, for example. A connection loss detector continually monitors the connection between the client device of the user and the game server using any known tools (e.g., ping, traceroute, etc.), and when a connection loss is detected, the connection loss detector triggers a signal to the prediction logic 105, as illustrated in operation 720. The prediction logic 105 responds to the trigger signal by querying the PFB 106 and retrieving select ones of the predicted frames to match the game content and game context of the frames encompassing the gap. The select ones of the predicted frames are included with the subsequent frames of game content representing a subsequent game state, as illustrated in operation 625. The predicted frames are included to fill the gap in the subsequent frames so that the game content included in the predicted frames contextually match the game content of the missing frames defining the gap. The frames of subsequent game content with the predicted frames are forwarded to the display screen of the client device for rendering. The subsequent frames, when rendered, provide contiguous game content without any disruptions, making it believe as though there were no connection drops or communication latency. Further, these predicted frames attempt to fill gaps without significant latency in rendering the game content so that the user can have a more enriching gameplay experience even when they have intermittent connections issues.

Figure 6B:
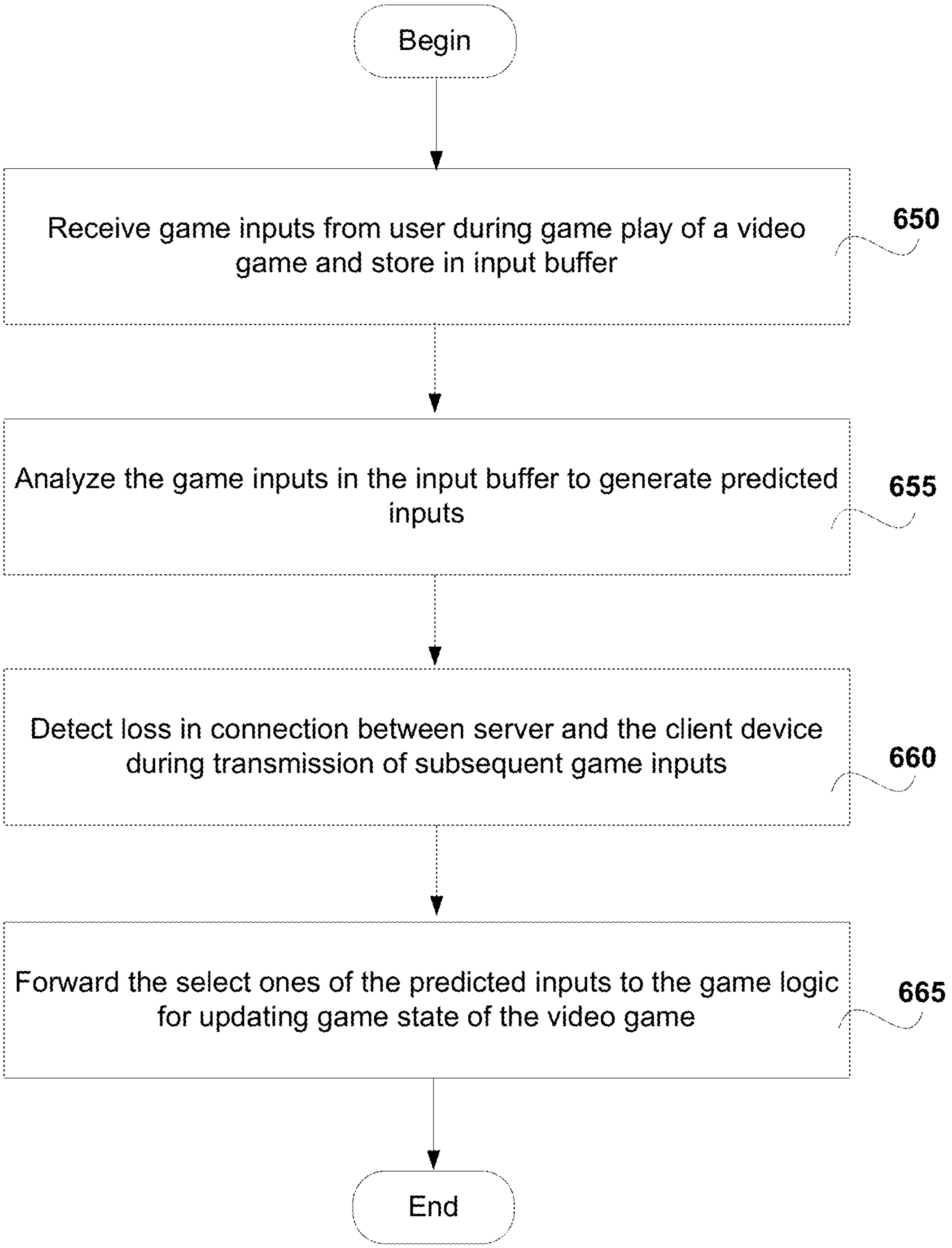
FIG. 6B illustrates operations of a method used for generated predicted game inputs of a user to fill any gaps in subsequent game inputs provided by the user via a client device, in one implementation.

FIG. 6B illustrates flow of operations of a method for providing streaming content of a video game, in accordance with some implementations. The operations of the method illustrated in FIG. 6B are performed by a processor of a server (e.g., game server 300) executing the input prediction logic 305. In some implementations, the game server 300, in addition to executing an instance of the video game, is also configured to execute other applications including the input prediction logic 305. In alternate implementations, a different server that is communicatively connected to the game server 300 is used to execute the input prediction logic 305 using the game inputs and game content representing the current game state received from the game server 300. The method begins at operation 650 where game inputs generated by a user at the client device 100 are received at a server executing the input prediction logic 305, wherein the server is a game server 300 or a server communicatively coupled to the game server 300. In one implementation, the system configuration is kept simple by considering the game server to be the same as the server executing the input prediction logic 305, whereas in reality, the game server can be different from the server executing the input prediction logic 305. During gameplay of the video game, the game inputs are transmitted by client device 100 of each user to the game server 300 to allow the game logic to update game state of the video game.

The game inputs received from each client device are also stored in a game input buffer 303 and are analyzed by the input prediction logic 305 to generate predicted inputs that are likely to be generated by the user following the game inputs received at the game server, as illustrated in operation 655. In a multi-player video game, the game inputs are received from a plurality of users and the game state is updated by applying the game inputs of the plurality of users. Consequently, when the predicted inputs are generated, the predicted inputs are generated for each user based on the context of the video game, the current state of the video game, the interaction style of the user, etc. The predicted inputs of each user are stored in a prediction input buffer 306 and used to fill any gap in the game inputs received from the respective user.

When a connection loss is detected at the game server, a connection loss detector 307 at the game server 300 detects the connection loss and, in response, generates a trigger signal that is transmitted to the input prediction engine 305, as illustrated in operation 660. The connection loss can be detected using ping or traceroute or any other tools that are available at the connection loss detector 307 or at the game server 300. The connection loss can occur between a client device of a particular user and the game server 300 while the connections between the client devices of other users and the game server remain strong. The input prediction engine 305, in response to the trigger signal, queries the prediction input buffer 306 and receives select one(s) of the predicted input(s) for the user associated with the client device that has experienced connection loss, wherein the connection loss is brief. The select one(s) of the predicted inputs are identified to be likely generated by the user following the current game inputs and are contextually related to the current game inputs.

The select ones of the predicted inputs are provided to the game logic executing at the game server to drive the game state of the video game and for generating the game content for transmitting to the client device of the user, as illustrated in operation 665. The game content that is generated takes into consideration the game inputs of other users and the predicted input of the particular user to generate the subsequent game state and to generate the subsequent frames of game content representing the subsequent game state for forwarding to the client device for rendering. By taking into consideration the predicted inputs of the particular user, the game content that is generated for the video game will reflect the interactions of the plurality of users and of the particular user. The particular user can enjoy the gameplay of the video game without any disruption in the game content and without feeling that their input is not considered.

Figure 7:
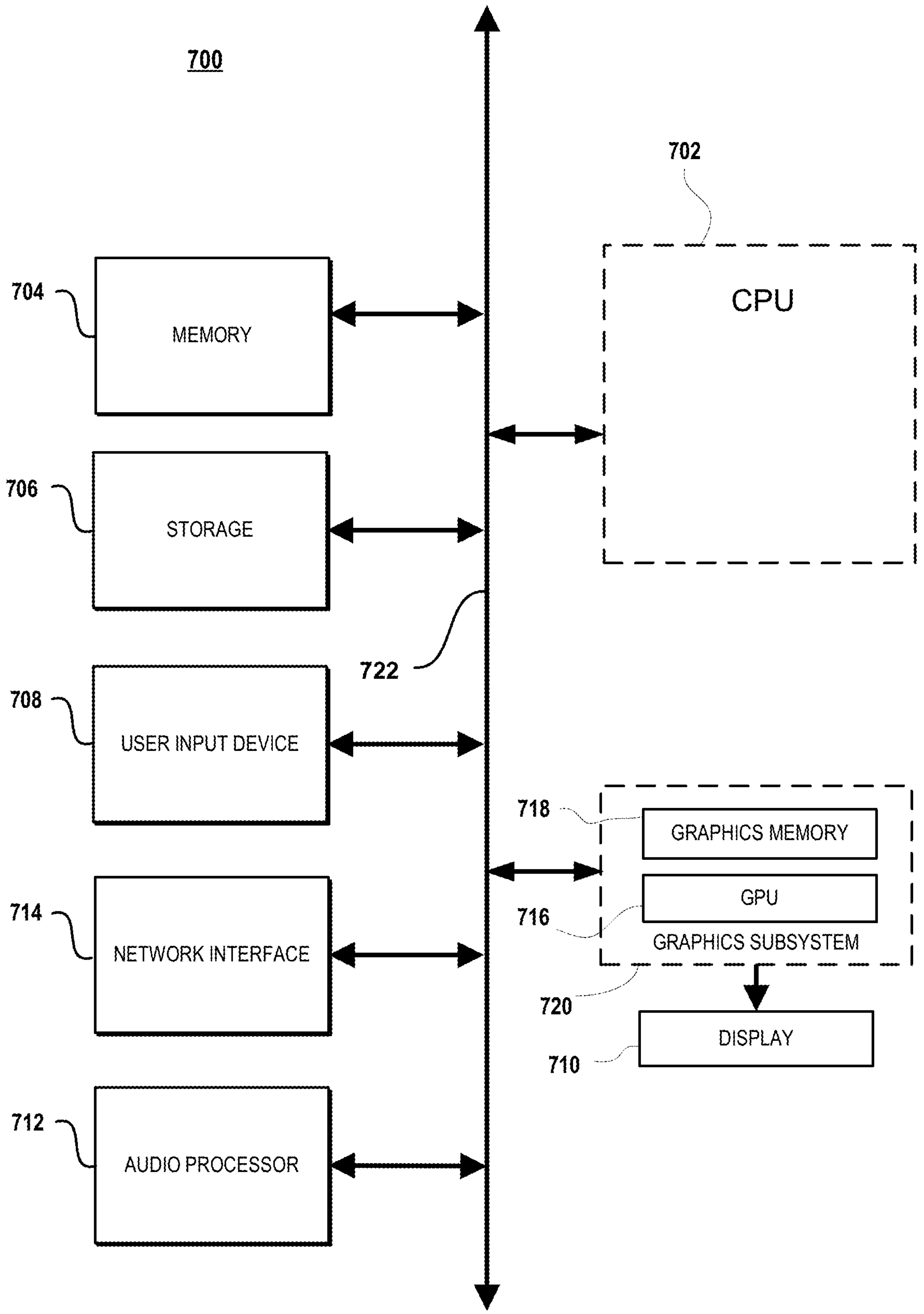
FIG. 7 illustrates components of an example client device and/or server that can be used to perform aspects of the various implementations of the present disclosure.

FIG. 7 illustrates components of an example device 700 that can be used to perform aspects of the various embodiments of the present disclosure. This block diagram illustrates the device 700 that can incorporate or can be a personal computer, video game console, personal digital assistant, a server or other digital device, suitable for practicing an embodiment of the disclosure. The device 700 includes a CPU 702 for running software applications and optionally an operating system. The CPU 702 includes one or more homogeneous or heterogeneous processing cores. For example, the CPU 702 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. The device 700 can be a localized to a player playing a game segment (e.g., game console), or remote from the player (e.g., back-end server processor), or one of many servers using virtualization in a game cloud system for remote streaming of gameplay to clients.

A memory 704 stores applications and data for use by the CPU 702. A storage 706 provides non-volatile storage and other computer readable media for applications and data and may include fixed disk drives, removable disk drives, flash memory devices, compact disc-ROM (CD-ROM), digital versatile disc-ROM (DVD-ROM), Blu-ray, high definition-DVD (HD-DVD), or other optical storage devices, as well as signal transmission and storage media. User input devices 708 communicate user inputs from one or more users to the device 700. Examples of the user input devices 708 include keyboards, mouse, joysticks, touch pads, touch screens, still or video recorders/cameras, tracking devices for recognizing gestures, and/or microphones. A network interface 714 allows the device 700 to communicate with other computer systems via an electronic communications network, and may include wired or wireless communication over local area networks and wide area networks, such as the internet. An audio processor 712 is adapted to generate analog or digital audio output from instructions and/or data provided by the CPU 702, the memory 704, and/or data storage 706. The components of device 700, including the CPU 702, the memory 704, the data storage 706, the user input devices 708, the network interface 714, and an audio processor 712 are connected via a data bus 722.

A graphics subsystem 720 is further connected with the data bus 722 and the components of the device 700. The graphics subsystem 720 includes a graphics processing unit (GPU) 716 and a graphics memory 718. The graphics memory 718 includes a display memory (e.g., a frame buffer) used for storing pixel data for each pixel of an output image. The graphics memory 718 can be integrated in the same device as the GPU 716, connected as a separate device with the GPU 716, and/or implemented within the memory 704. Pixel data can be provided to the graphics memory 718 directly from the CPU 702. Alternatively, the CPU 702 provides the GPU 716 with data and/or instructions defining the desired output images, from which the GPU 716 generates the pixel data of one or more output images. The data and/or instructions defining the desired output images can be stored in the memory 704 and/or the graphics memory 718. In an embodiment, the GPU 716 includes three-dimensional (3D) rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 720 periodically outputs pixel data for an image from the graphics memory 718 to be displayed on the display device 710. The display device 710 can be any device capable of displaying visual information in response to a signal from the device 700, including a cathode ray tube (CRT) display, a liquid crystal display (LCD), a plasma display, and an organic light emitting diode (OLED) display. The device 700 can provide the display device 710 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a GPU since it will be doing a large number of relatively simple mathematical operations (e.g., matrix transformations). Other game engine segments that require fewer but more complex operations may be provisioned with a processing entity associated with one or more higher power CPUS.

By distributing the game engine, the game engine is provided with clastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and an input/output (I/O) interface. The client device can be a personal computer (PC), a mobile phone, a netbook, a personal digital assistant (PDA), etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device system, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In an embodiment, although the embodiments described herein apply to one or more games, the embodiments apply equally as well to multimedia contexts of one or more interactive spaces, such as a metaverse.

In one embodiment, the various technical examples can be implemented using a virtual environment via the HMD. The HMD can also be referred to as a virtual reality (VR) headset. As used herein, the term "virtual reality" (VR) generally refers to user interaction with a virtual space/environment that involves viewing the virtual space through the HMD (or a VR headset) in a manner that is responsive in real-time to the movements of the HMD (as controlled by the user) to provide the sensation to the user of being in the virtual space or the metaverse. For example, the user may see a three-dimensional (3D) view of the virtual space when facing in a given direction, and when the user turns to a side and thereby turns the HMD likewise, the view to that side in the virtual space is rendered on the HMD. The HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on the HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

It should be noted that in various embodiments, one or more features of some embodiments described herein are combined with one or more features of one or more of remaining embodiments described herein.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for providing streaming content of a video game at a client device, comprising:

receiving frames of streaming content at the client device for rendering, the streaming content included in the frames represent a current game state of the video game, the frames are received from a server executing the video game and are stored in a compressed frame buffer at the client device prior to forwarding to a display screen associated with the client device for rendering;

analyzing the frames of streaming content stored in the compressed frame buffer to generate predicted frames of streaming content representing a subsequent game state that are likely to be generated for the video game following the frames of streaming content, the predicted frames stored in a prediction frame buffer;

detecting a gap in the subsequent frames of streaming content received from the server at the client device; and responsively including select ones of the predicted frames stored in the prediction frame buffer to fill the gap in the subsequent frames of streaming content, the subsequent frames of streaming content with the select ones of the predicted frames filling the gap forwarded to the display screen of the client device for rendering, the select ones of the predicted frames identified to include streaming content that is contextually relevant to fill the gap in the subsequent frames of streaming content, wherein operations of the method are performed by a processor of the client device.

2. The method of claim 1, wherein the predicted frames are maintained in the prediction frame buffer for a defined time period and discarded after expiration of the defined time period.

3. The method of claim 2, wherein the defined time period for storing the predicted frames in the prediction frame buffer corresponds with a frame time period that the frames of streaming content are stored in the compressed frame buffer.

4. The method of claim 1, wherein the predicted frames are replenished in the prediction frame buffer at a same rate as the frames of streaming content in the compressed frame buffer.

5. The method of claim 1, wherein a number of the predicted frames generated from the frames of streaming content in the compressed frame buffer are fewer than a number of frames of streaming content stored in the compressed frame buffer, and wherein the number of the select ones of the predicted frames used to fill the gap is less than the number of frames of streaming content defining the gap.

6. The method of claim 1, wherein a number of the predicted frames generated from the frames of streaming content in the compressed frame buffer are equal to a number of frames of the streaming content stored in the compressed frame buffer, and wherein the number of the select ones of the predicted frames used to fill the gap is equal to the number of frames of streaming content defining the gap.

7. The method of claim 1, wherein the predicted frames in the prediction frame buffer are replenished at a lesser rate than a rate at which the frames of streaming content are replenished in the compressed frame buffer.

8. The method of claim 1, wherein the predicted frames are replenished in the prediction frame buffer at defined time intervals, the defined time intervals specified based on a quality of communication connection between the server and the client device.

9. The method of claim 1, wherein the predicted frames generated for a subsequent portion of the streaming content are discarded upon detecting the frames of streaming content for the subsequent portion are received at the compressed frame buffer.

10. The method of claim 1, wherein a number of frames of streaming content received and stored in the compressed frame buffer is based on frame rate at which the streaming content is transmitted from the server to the client device.

11. The method of claim 1, wherein the frames of streaming content received at the compressed frame buffer are arranged in accordance to temporal attributes and the arranged frames of streaming content are forwarded to the display screen for rendering, and wherein the predicted frames are generated using the frames of streaming content that are arranged temporally.

12. The method of claim 1, wherein the frames of streaming content received from the server are compressed frames of streaming content, and wherein analyzing the frames of streaming content includes decompressing the frames of streaming content received at the compressed frame buffer prior to generating the predicted frames.

13. The method of claim 11, wherein the predicted frames are generated using artificial intelligence (AI), the AI generating an AI model for the video game using streaming content and game context of the video game generated from game inputs provided by a plurality of users that have previously played the video game, the AI model continuously updated as and when subsequent game inputs are received from the plurality of users during game play of the video game and used to identify the predicted frames.

14. The method of claim 1, wherein the frames of streaming content are stored in a second frame buffer in addition to storing in the compressed frame buffer, the frames from the compressed frame buffer formatted and forwarded to the display screen for rendering and the frames in the second frame buffer are used in analyzing to generate the predicted frames, and wherein the frames of streaming content are replenished in the second frame buffer less frequently than the frames of streaming content in the compressed frame buffer.

15. The method of claim 1, wherein the gap in the subsequent frames is due to loss in connection between the client device and the server or due to communication latency experienced at the client device.

* * * * *